US011534885B2

(12) United States Patent
Scafutto Scotton et al.

(10) Patent No.: US 11,534,885 B2
(45) Date of Patent: Dec. 27, 2022

(54) AUTOMATED SYSTEMS AND PROCESSES FOR PREPARING VEHICLE SURFACES, SUCH AS AN AIRCRAFT FUSELAGE, FOR PAINTING

(71) Applicant: EMBRAER S.A., São José dos Campos (BR)

(72) Inventors: Rogério Scafutto Scotton, São José dos Campos (BR); Rodrigo Cesar Goncalves Poli, São José dos Campos (BR); Vitor Inacio Valdecir, São José dos Campos (BR); Jaime Leite Filho, São José dos Campos (BR)

(73) Assignee: YABORÃ INDÚSTRIA AERONÁUTICA S.A., São José dos Campos (BR)

( * ) Notice: Subject to any disclaimer, the term of this patent is extended or adjusted under 35 U.S.C. 154(b) by 1055 days.

(21) Appl. No.: 16/308,257

(22) PCT Filed: Jun. 9, 2016

(86) PCT No.: PCT/BR2016/000058
§ 371 (c)(1),
(2) Date: Dec. 7, 2018

(87) PCT Pub. No.: WO2017/210755
PCT Pub. Date: Dec. 14, 2017

(65) Prior Publication Data
US 2019/0262966 A1    Aug. 29, 2019

(51) Int. Cl.
*B24B 27/00*    (2006.01)
*B64F 5/40*    (2017.01)
(Continued)

(52) U.S. Cl.
CPC .......... *B24B 27/0038* (2013.01); *B24B 19/26* (2013.01); *B24B 27/0076* (2013.01);
(Continued)

(58) Field of Classification Search
CPC .. B24B 1/00; B24B 7/075; B24B 7/08; B24B 7/12; B24B 7/14; B24B 7/18;
(Continued)

(56) References Cited

U.S. PATENT DOCUMENTS 4,604,787 A * 8/1986 Silvers, Jr. ............. B23Q 7/046
                                                        414/730
5,138,800 A * 8/1992 Janusz ..................... B24C 3/065
                                                        451/92
(Continued)

FOREIGN PATENT DOCUMENTS

CA    2 861 803    4/2015
CN    105290946   2/2016
(Continued)

OTHER PUBLICATIONS

Machine Translation of CN106956191 (Year: 2017).*
International Search Report for PCT/BR2016/000058 dated Feb. 24, 2017, 6 pages.

*Primary Examiner* — Joel D Crandall
*Assistant Examiner* — Robert F Neibaur
(74) *Attorney, Agent, or Firm* — Nixon & Vanderhye P.C.

(57) ABSTRACT

Processe and system for preparing a vehicle surface (e.g., an aircraft fuselage) for painting include a preparation booth (100) which is sized and configured to house the vehicle (F). At least one robotic assembly (200a, 200b) is reciprocally movable within the preparation booth (100) relative to a longitudinal axis of the vehicle (F), and is provided with a robotic hand (230) having at least one abrasive disc (242a) attached to an attachment pad (242) of the robotic hand (230), and at least one nozzle (252a, 252b, 252c) for
(Continued)

discharging a stream of rinse fluid. Operation of the at least one robotic assembly (230) will cause the at least one abrasive disc (242*a*) of the robot hand (230) to abrade the surface of the vehicle (F). The robotic hand (230) may thereafter be maneuvered so that the at least one nozzle (252*a*, 252*b*, 252*c*) is directed toward the abraded vehicle surface (F). A stream of rinse fluid may then be discharged through the at least one nozzle (252*a*, 252*b*, 252*c*) and towards the abraded surface of the vehicle (F) so as to rinse the abraded surface of particulate matter.

13 Claims, 23 Drawing Sheets

(51) Int. Cl.

| | | |
|---|---|---|
| *B64F 5/30* | (2017.01) | |
| *B24B 19/26* | (2006.01) | |
| *B24B 53/007* | (2006.01) | |
| *B25J 9/16* | (2006.01) | |
| *B25J 11/00* | (2006.01) | |
| *B25J 15/00* | (2006.01) | |
| *B25J 5/04* | (2006.01) | |
| *B25J 21/00* | (2006.01) | |
| *B24D 9/08* | (2006.01) | |

(52) U.S. Cl.
CPC .............. *B24B 53/007* (2013.01); *B25J 5/04* (2013.01); *B25J 9/1679* (2013.01); *B25J 11/0065* (2013.01); *B25J 11/0085* (2013.01); *B25J 15/0019* (2013.01); *B25J 15/0066* (2013.01); *B25J 21/00* (2013.01); *B64F 5/30* (2017.01); *B64F 5/40* (2017.01); *B24D 9/085* (2013.01)

(58) Field of Classification Search
CPC ..... B24B 7/186; B24B 27/0076; B24B 41/02; B24B 45/006; B24B 55/02; B24B 57/02
USPC ... 451/5, 6, 11, 36, 259, 278, 279, 280, 354, 451/361, 362
See application file for complete search history.

(56) References Cited

U.S. PATENT DOCUMENTS

| | | | |
|---|---|---|---|
| 6,745,108 B1* | 6/2004 | McGuire | ................. B25J 21/00 700/291 |
| 8,517,799 B2* | 8/2013 | Panergo | ............. B24B 27/0038 451/28 |
| 2004/0048549 A1 | 3/2004 | Beaudoin et al. | |
| 2015/0375390 A1* | 12/2015 | Becroft | ............... B05B 13/0431 901/41 |
| 2016/0130017 A1 | 5/2016 | Best et al. | |
| 2019/0262963 A1* | 8/2019 | Bittorf | ................ B24B 27/0084 |

FOREIGN PATENT DOCUMENTS

| | | | | |
|---|---|---|---|---|
| CN | 106956191 A | * | 7/2017 | ............. B24B 19/00 |
| DE | 10 2012 006 502 | | 10/2013 | |
| EP | 1 103 310 | | 5/2001 | |
| EP | 2 589 463 | | 5/2013 | |
| GB | 2 352 417 | | 1/2001 | |
| WO | 97/17173 | | 5/1997 | |
| WO | 2012/161998 | | 11/2012 | |
| WO | 2015/125068 | | 8/2015 | |

* cited by examiner

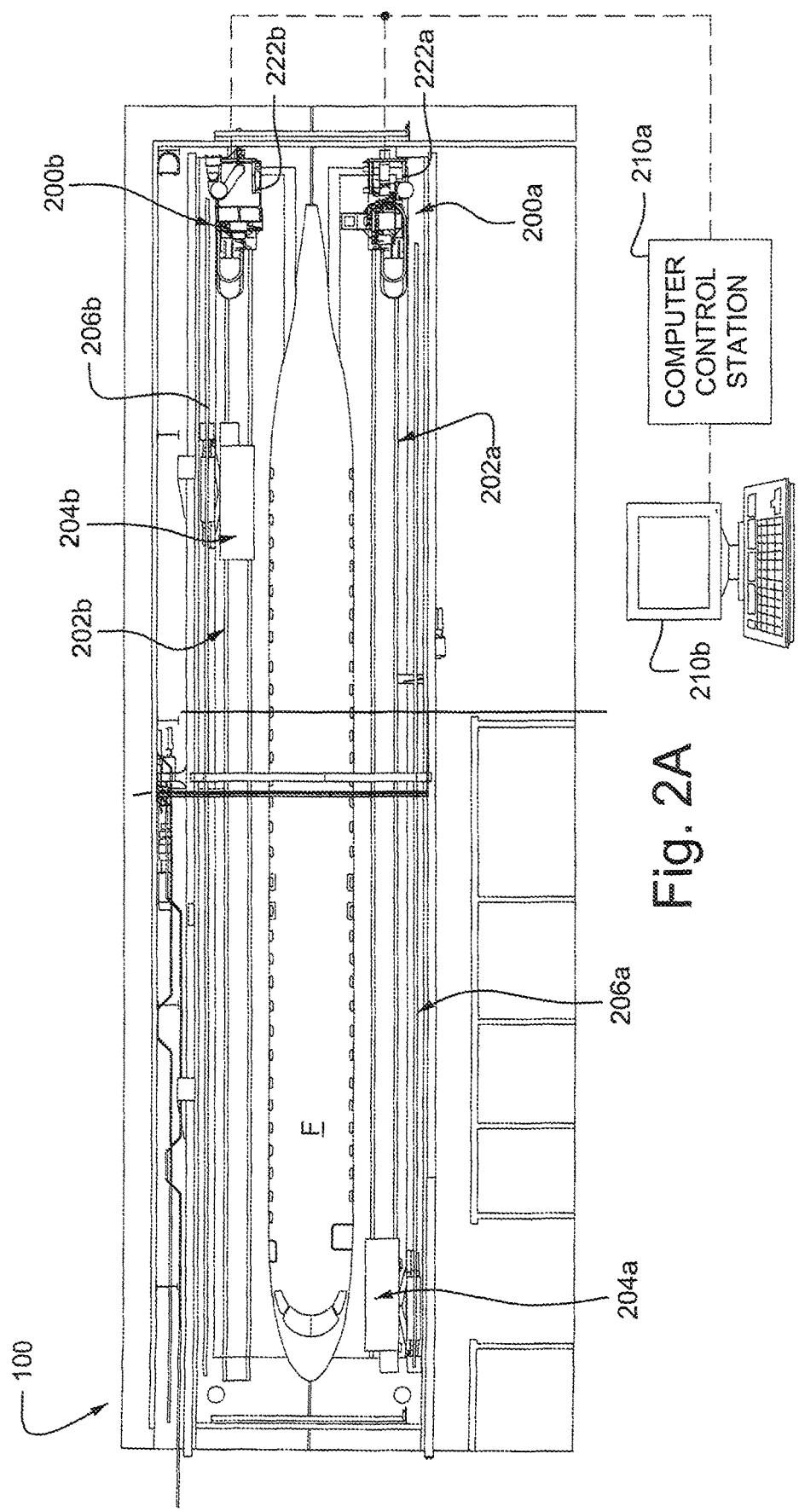

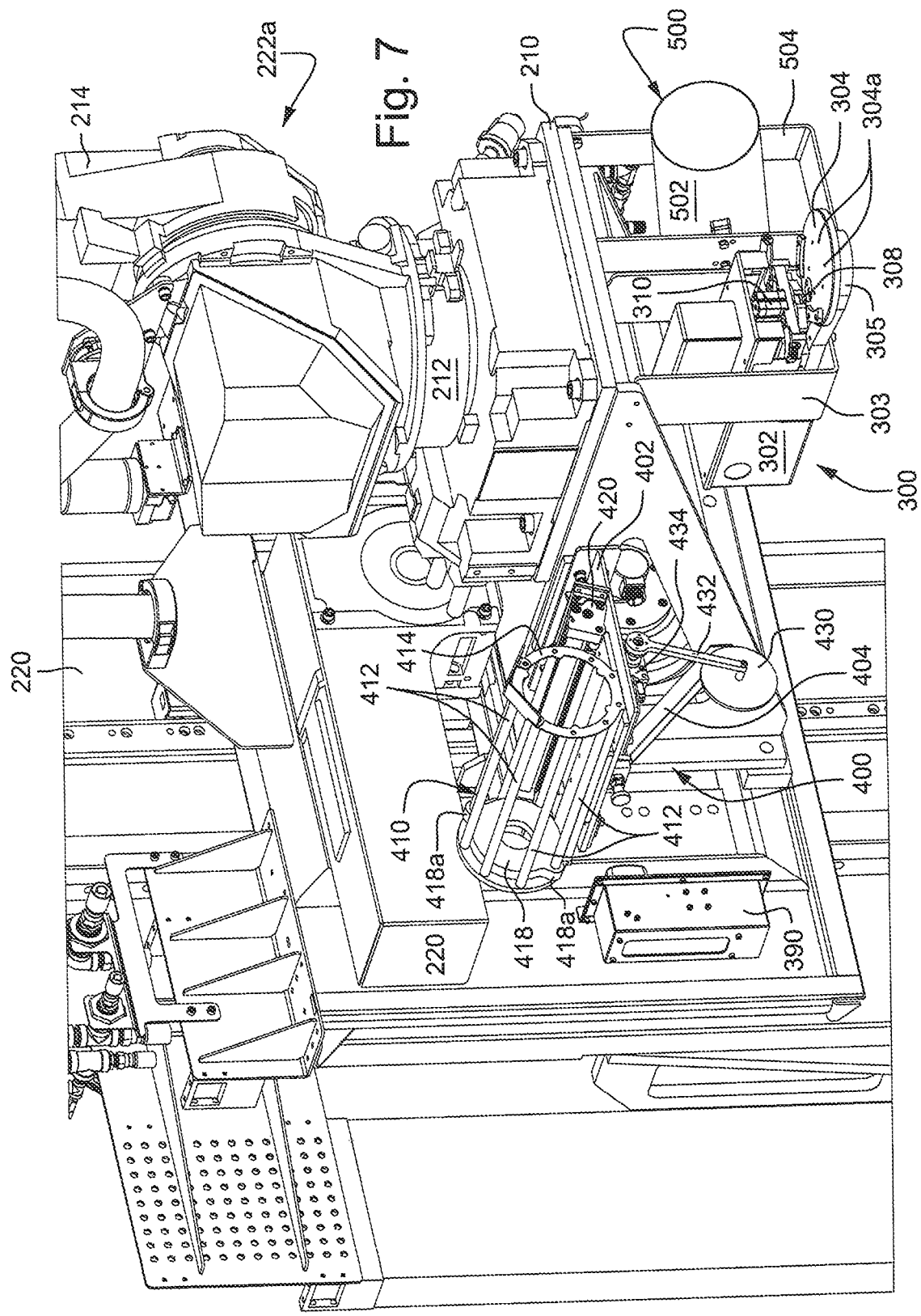

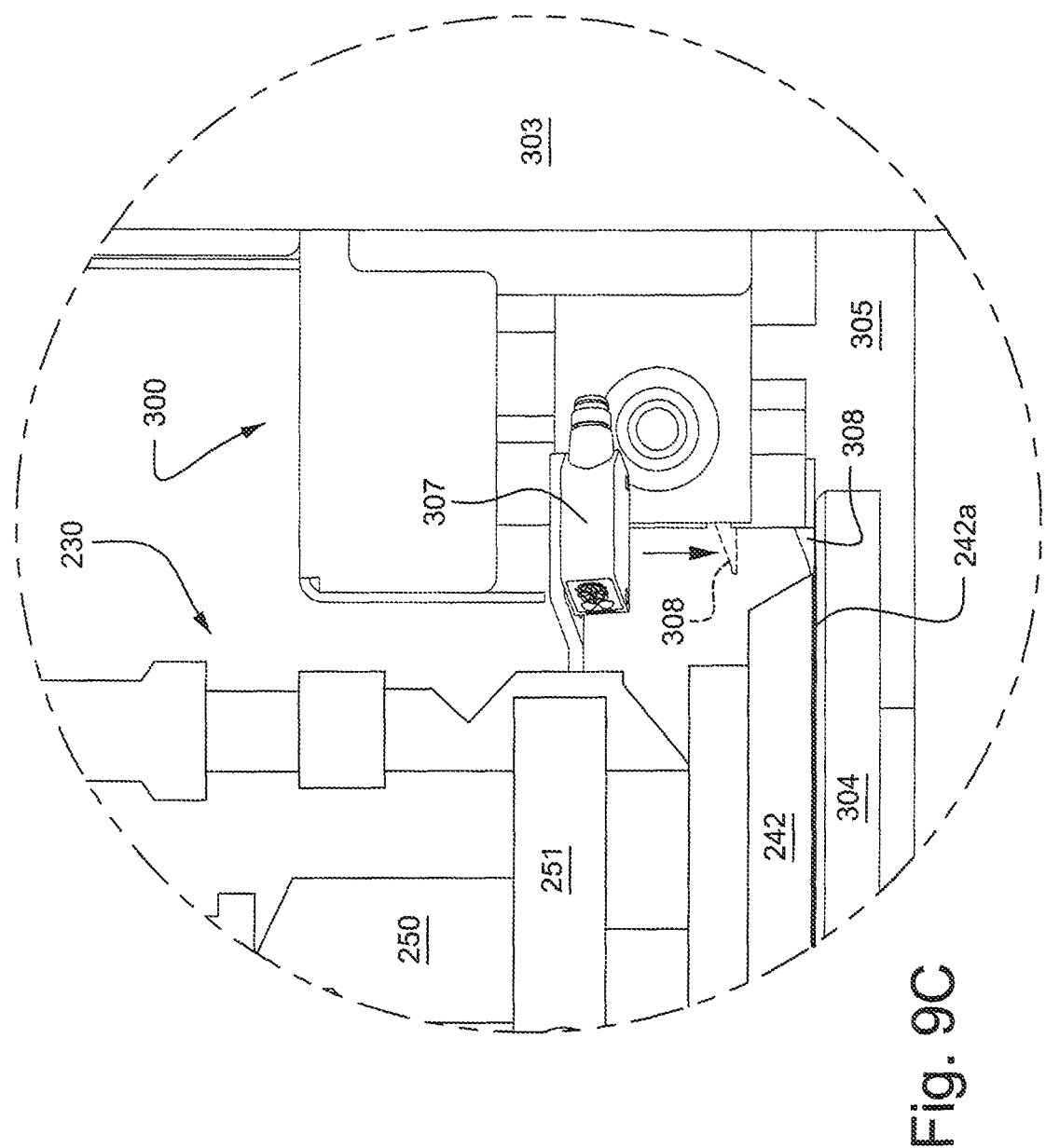

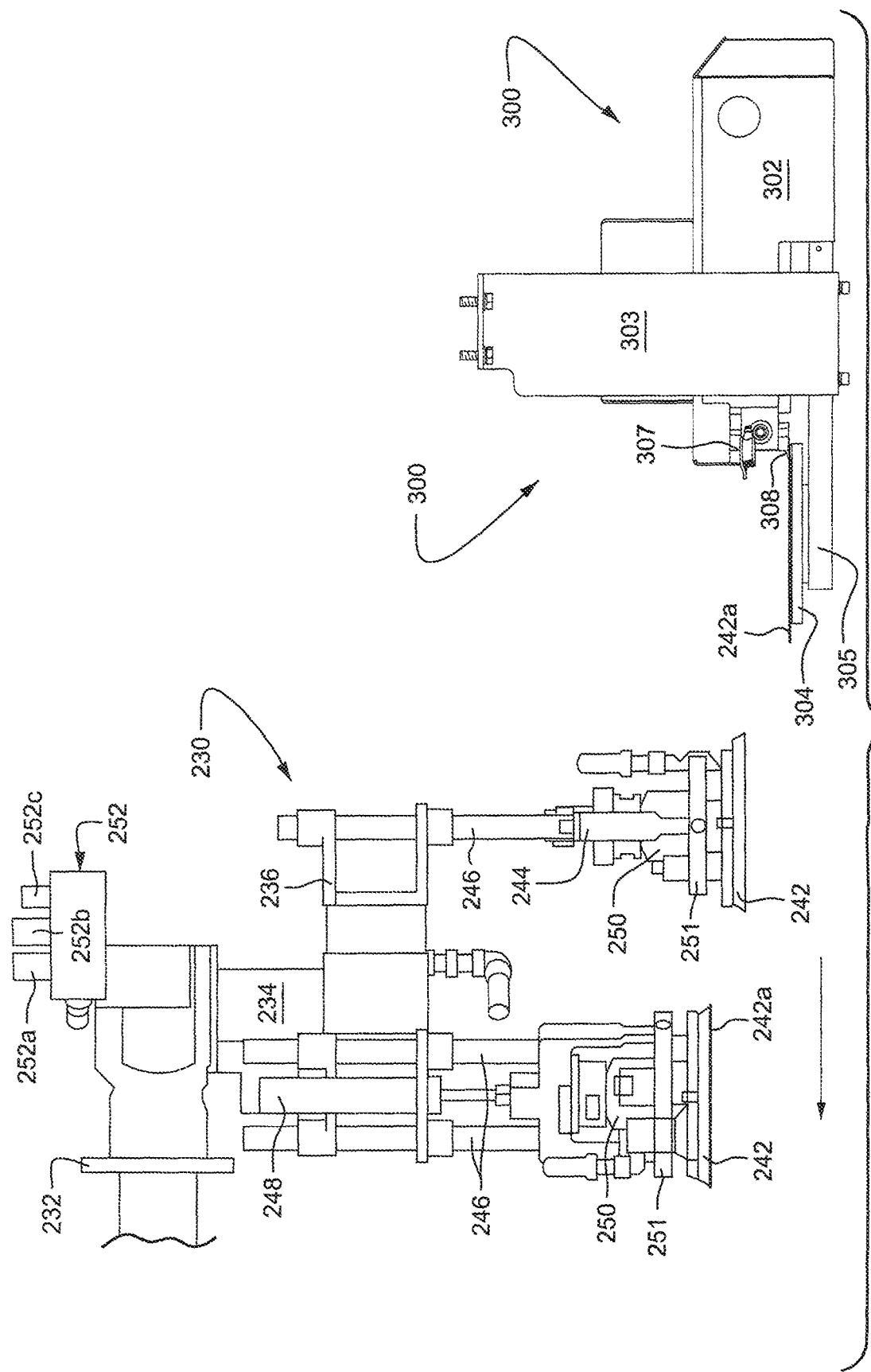

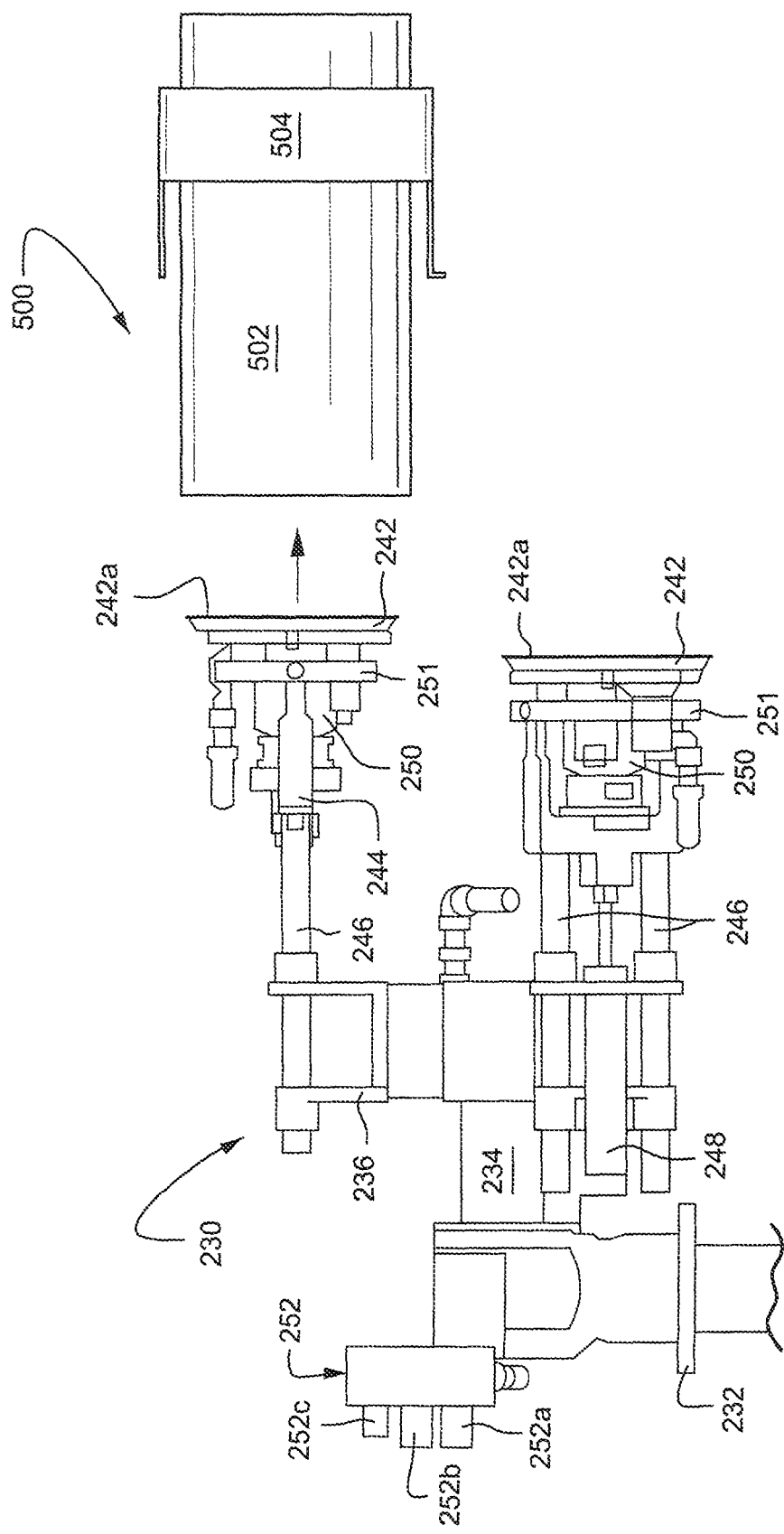

AUTOMATED SYSTEMS AND PROCESSES FOR PREPARING VEHICLE SURFACES, SUCH AS AN AIRCRAFT FUSELAGE, FOR PAINTING

This application is the U.S. national phase of International Application No. PCT/BR2016/000058 filed Jun. 9, 2016, the entire contents of each of which is hereby incorporated by reference.

FIELD

The embodiments disclosed herein relate generally to automated vehicle manufacturing processes. In specific embodiments, systems and methods are provided by which a vehicle surface, e.g., the surface of an aircraft fuselage, is prepared for painting processes using an automated system that performs numerous fully automated sub-processes with assistance of anthropomorphic robotic arms.

BACKGROUND

A vehicle surface, e.g., the surface of an aircraft fuselage, must be free from dust, oil, grease, oxides, printing paints, resins and other potential contaminants prior to surface painting. In this regard, the surfaces of the aircraft fuselage must be cleaned and well prepared so as to receive subsequent paint coatings in order to avoid issues, such as:
  a) Bubbling (the occurrence of air or solvent vapors as small bubbles in the paint coating);
  b) Cratering (small bowl-shaped depressions in the paint coating which may or may not expose the underlying surface which is caused by repulsion of the wet applied coating due to the presence of a surface contaminant such as oil, grease, silicone materials and/or by the contamination of the compressed air, environment and/or by the solvent evaporating too rapidly from the wet applied coating);
  c) Peeling (the paint coating peels totally or partially from the surface as may be caused by the lack of adherence of the film and the substrate or the films between coats typically due to improper surface preparation, excessive humidity and/or high substrate temperature, incompatibility among paints and surface contamination);
  d) Non-adherent overspray (paint particles are sprayed on dry coats already painted);
  e) Pin-holing (defects consisting of tiny holes in the coating which penetrate to the underlying surface typically caused by the paint solvent evaporating too rapidly from the wet applied coating);
  f) Popping (defects characterized by raised bumps in the surface that are typically caused by solvent vapor forming within the coating after it has begun to skin-over); and
  g) Wrinkles (defects in which the coating surface skins over and then absorbs liquid from within the coating thereby resulting in swelling of the surface skin with the formation of a wrinkled texture).

Conventional manual process techniques to prepare the surface of an aircraft fuselage for painting need to follow the requirements of the paint product so as to ensure that each task in the painting cycle, including the surface preparation and subsequent paint application, is coordinated. For this reason, there are many issues that are present with manual painting processes, such as the necessary cycle time for each sub-process that can result in low productivity, rework, additional labor cost, poor quality and results that are unreliable.

The disadvantages of manual painting processes are the result of an essentially craftsman process which is the current state of the art in terms of aircraft fuselage painting. The sub-processes attendant to fuselage painting demand high amounts of man-hours since each operator is responsible for many tasks. Moreover, there is a general lack of repeatability and standardization of the conventional fuselage painting process in addition to providing a very slow learning curve for the various operators. In addition, the sub-processes for fuselage painting demands high consumption of the water, acids, degreaser products, sandpapers, special clothes, tools and masks for the operators. The technologies employed in each process stage are thus obsolete, demanding substantial physical effort for each operator, and sometimes ergonomic issues as well.

An automated process for surface preparation would therefore provide a painting process that would be substantially more environmentally friendly as well as improving operator ergonomic issues while also improving the quality of the painting process because the fuselage surface would be better prepared. Even though certain individual sub-processes may be known to be capable of being performed by a separately automated technique (e.g., sanding the surface of a fuselage as disclosed by CA 2861803, the entire content of which is incorporated fully hereinto by reference), there remains absent in this art area a fully integrated aircraft fuselage surface preparation process.

Thus, although individual automated methods of surface preparation may already be known, it is still not possible to find any automated methods and integrated techniques in the current state of the art that provide a fully automated system for all the various sub-processes of aircraft fuselage painting that are integrated in a single paint preparation booth since each such process has its own particularities and numerous sub-processes must performed. It is towards providing systems and methods to allow for fully automated and integrated aircraft fuselage painting that the embodiments described herein are directed.

SUMMARY

One objective of the embodiments disclosed herein is to provide fully automated processes and systems for aircraft fuselage surface preparation which can be integrated in a single paint preparation booth in which all stages of the surface preparation may occur, that is all fuselage surface preparation operations are performed in a unique location which is fully automated. The sequence of the processing follows the sequential sub-process stages as generally summarized below.
  a) The fuselage is moved in the preparation booth and a vision system fixed on the base of a robot assembly performs the necessary corrective location maneuvers for the fuselage in the space and generates automatically the offsets of the offline programming paths. This ensure that any variation of the fuselage location in all directions of roll, pitch and yaw axes are properly changed in order to avoid any collision between the robot and the fuselage.
  b) The aerodynamic sealing sanding process (e.g., using Velcro-Brand pads) may be performed in order to provide a very smooth surface with no deflection or scratches that may become evident once the fuselage has been painted.

c) The primer sanding by use of sandpaper pads may be performed in order to activate and remove to a very thin thickness the primer painted by a previous process stage for the individual fuselage sections.
d) The fuselage may be provided with a removable protective temporary coating for protection of metallic surfaces against physical damage due to inadvertent impacts during the handling and operations of conforming, drilling and countersinking. The automated process may apply a warmed (e.g., up to about 60° C.) high pressure degreaser product to melt and remove the protective temporary coating from the fuselage surface. Water may also be applied in parallel with the degreaser (i.e., with both degreaser application and water application running simultaneously back and forth) in order to avoid staining the fuselage surface when the degreaser dries.
e) A full rinse process may be performed to remove any remain dust on the surface.
f) The circumferential rivet gaps in the fuselage may be covered by the automated application of a relatively thicker paint coating thereon.
g) The automated scrubbing process may be performed by using suitable abrasive pads, e.g., SCOTCH BRITS® abrasive pads, with warm degreaser and water at the same time in order to eliminate any dust on the surface. The three sub-processes are performed in parallel in order to avoid staining the fuselage surface when the degreaser dries (i.e., all such sub-processes run simultaneously back and forth).
h) The full rinse process is performed again to remove any remaining dust on the fuselage surface. An acid application is performed on the entire surface area of the fuselage to increase protection against the corrosion and improve the surface for painting adherence. The acid application is performed with water in order to prevent surface damage from occurring (i.e., the acid application and water application processes run simultaneously back and forth).
i) The full rinse process is performed again to remove any remaining dust on the fuselage surface.

Thus, according to certain embodiments, processes and systems are provided which include a preparation booth which is sized and configured to house the vehicle and having at least one robotic assembly which is reciprocally movable within the preparation booth relative to a longitudinal axis of the vehicle, the robotic assembly comprising a robotic hand having at least one abrasive disc attached to an attachment pad of the robotic hand, and at least one nozzle for discharging a stream of rinse fluid. A vehicle having a surface to be prepared for painting (e.g., an aircraft fuselage) may be positioned within the preparation booth so that operation of the at least one robotic assembly will cause the at least one abrasive disc of the robot hand to abrade the surface of the vehicle. The robotic hand may thereafter be maneuvered so that the at least one nozzle is directed toward the abraded vehicle surface. A stream of rinse fluid may then be discharged through the at least one nozzle and towards the abraded surface of the vehicle so as to rinse the abraded surface of particulate matter.

The robotic assembly may be provided with an abrasive disc removal assembly for removing an exhausted abrasive disc from the attachment pad of the robotic hand. If provided with such a disc removal assembly, the robotic hand may be maneuvered relative to the disc removal system so as to remove the exhausted abrasive disc from the attachment pad of the robotic hand.

The disc removal assembly may itself include a target platform for positioning the abrasive disc attached to the attachment pad of the robotic hand and a finger element reciprocally movable between raised and lowered positions. The finger element engages a perimetrical edge of the abrasive pad when in a lowered position to thereby positionally capture the exhausted abrasive disc against the target platform. Tilting movement of the robotic hand away from the finger element while the exhausted abrasive pad is positionally captured against the target platform thereby responsively strips the exhausted abrasive disc from the attachment pad of the robotic hand. The target platform may comprise apertures for discharge of pressurized air to thereby blow the exhausted abrasive disc away from the target platform when the finger element is in the raised position thereof.

The robotic assembly may be provided with a disc replenishment assembly for attaching an unused ("fresh") abrasive disc onto the attachment pad of the robotic hand. The disc replenishment assembly may include a cylindrical sleeve cage having an open forward end for holding a stack of unused abrasive discs. A shutter element may also be provided that is movable between an inoperative position wherein the open forward end of the cylindrical sleeve cage is uncovered by the shutter element so as to expose a forwardmost one of the abrasive discs in the stack, and an operative condition wherein the open forward end of the cylindrical sleeve cage is covered by the shutter element. A sleeve base member may be slideably moveable within the sleeve cage so as to press the stack of unused abrasive discs against the shutter element and thereby reposition the stack of unused abrasive discs within the sleeve cage.

An abrasive disc cleaning assembly may also be provided as part of the robotic assembly. If present, the abrasive disc cleaning assembly may comprise a cylindrical cleaning canister for receiving therewithin an attachment pad and the abrasive disc attached thereto associated with the robotic hand for cleaning by a cleaning fluid.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 2A and 2B are top plan and side elevational views, respectively, of an exemplary fuselage surface painting preparation booth that may be employed in the automated surface preparation system according to the embodiments disclosed herein;

Figure 6A:
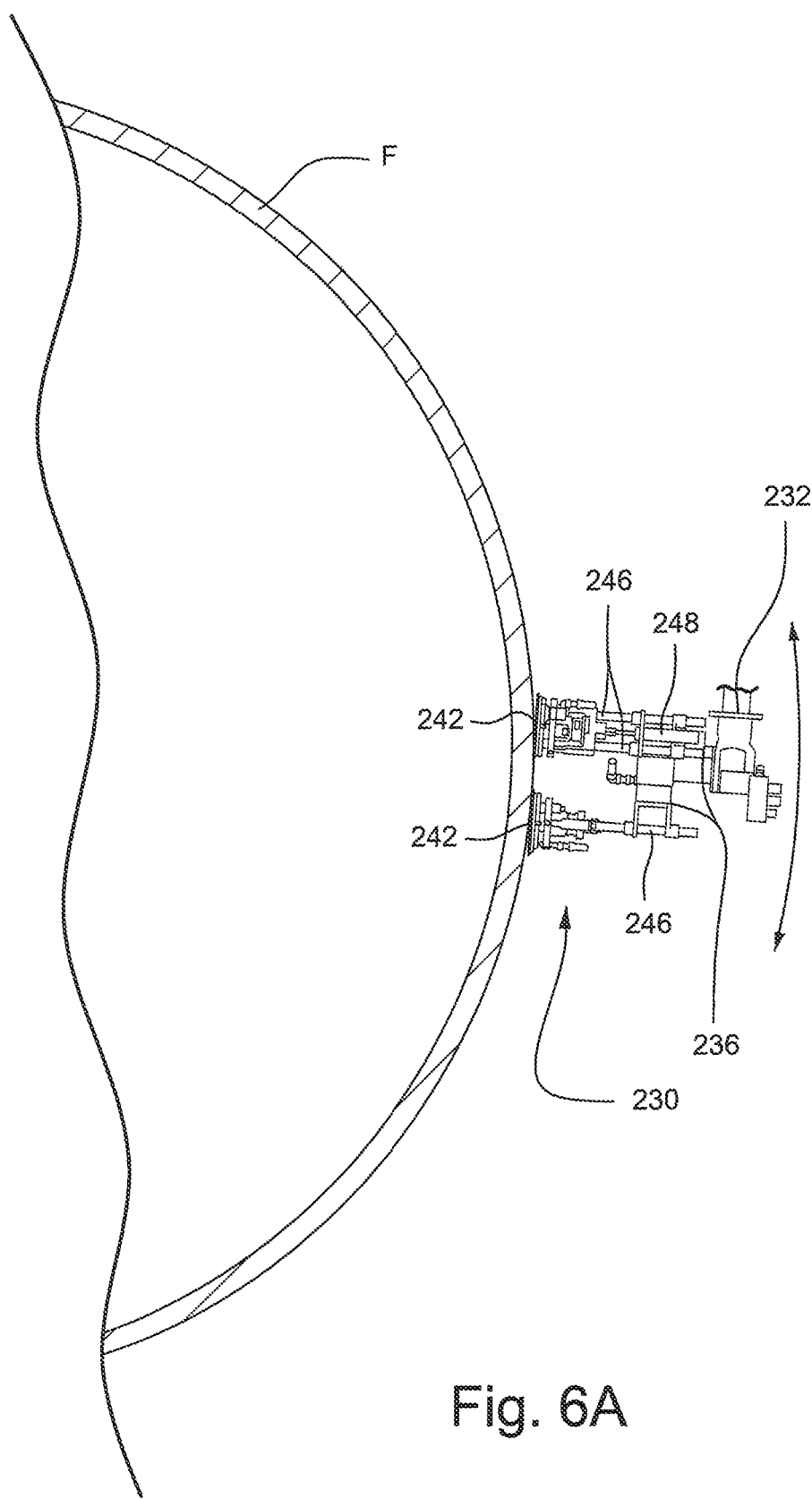
Figure 6B:
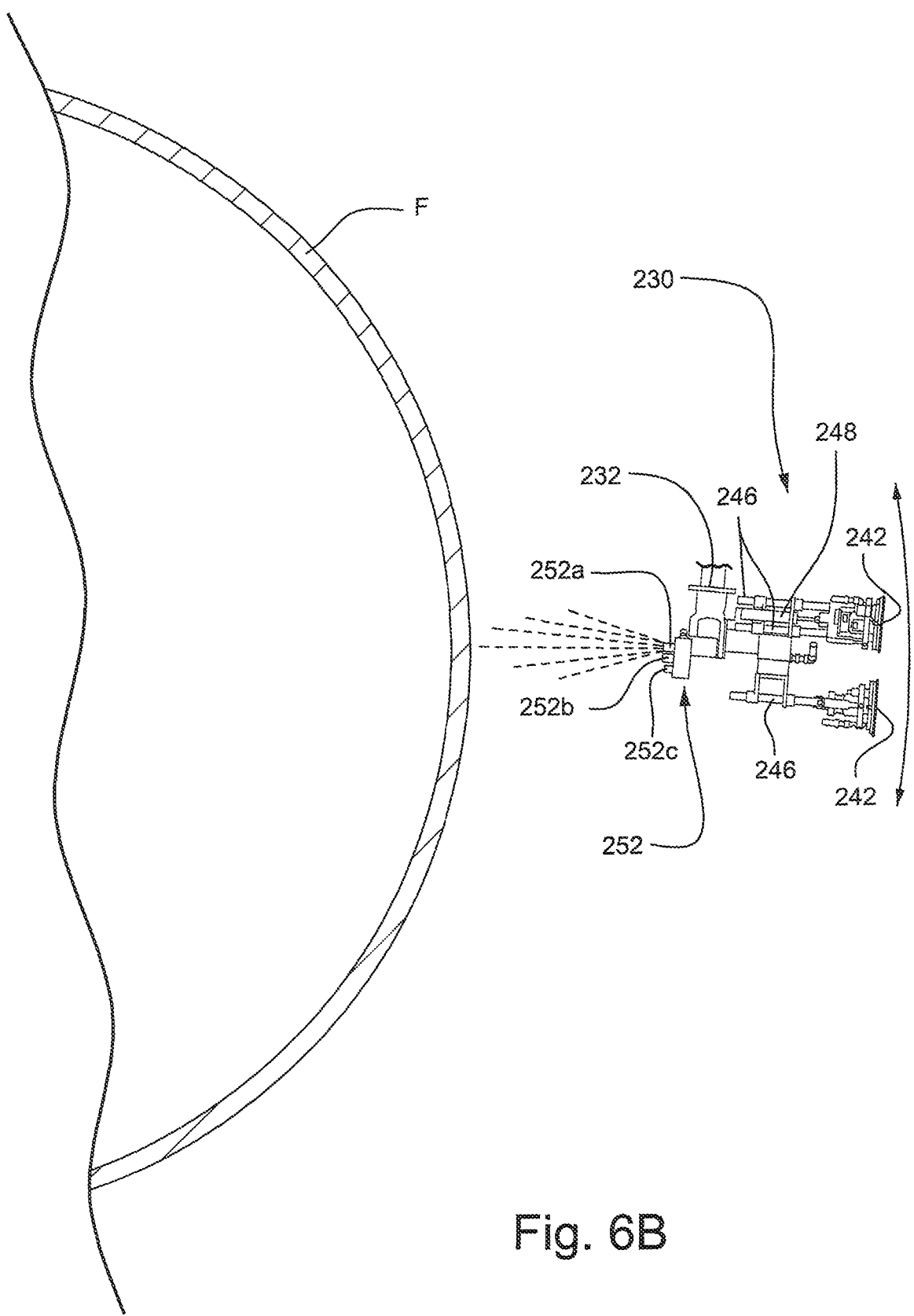
Figure 8:
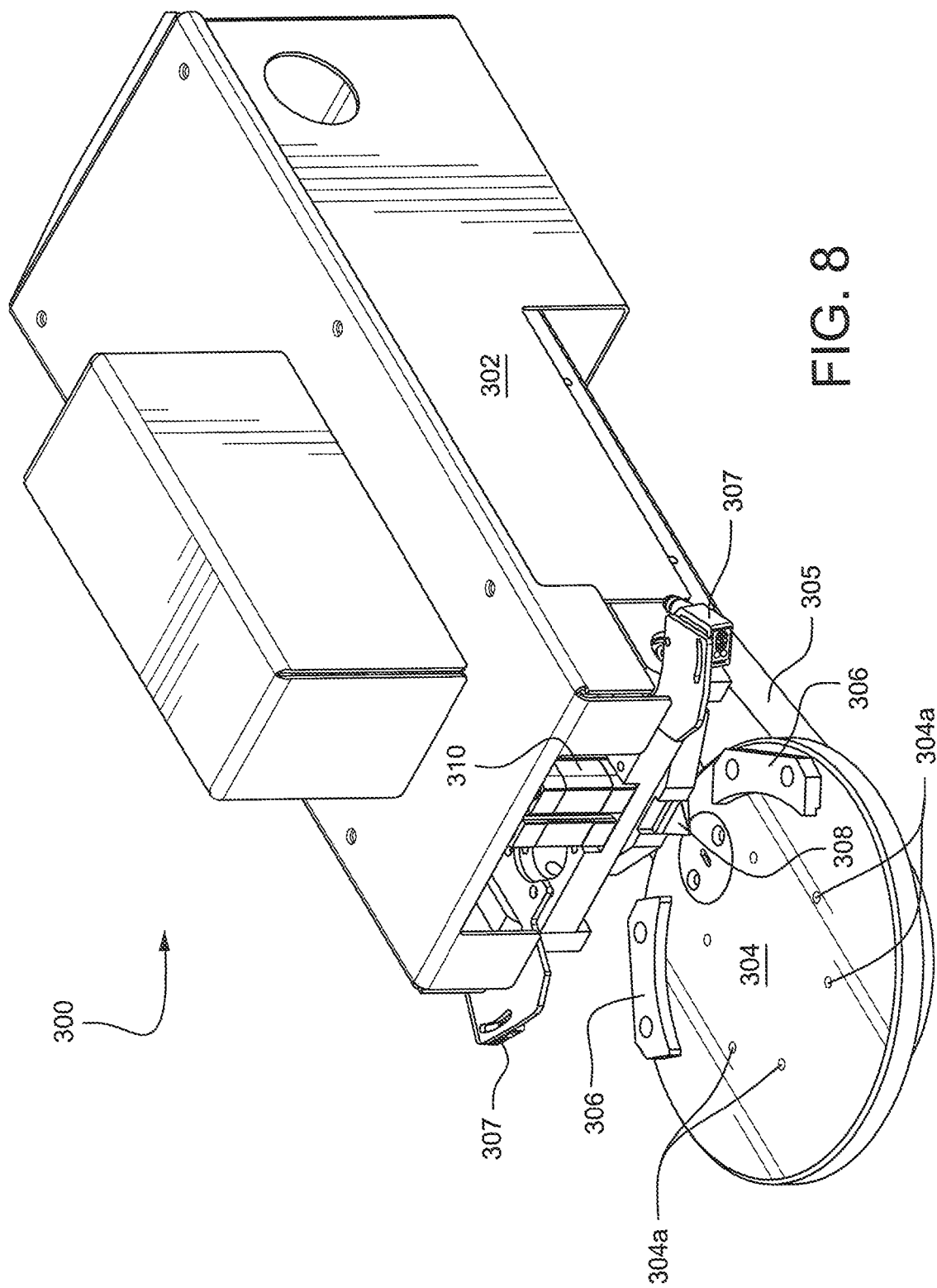
Figure 10A:
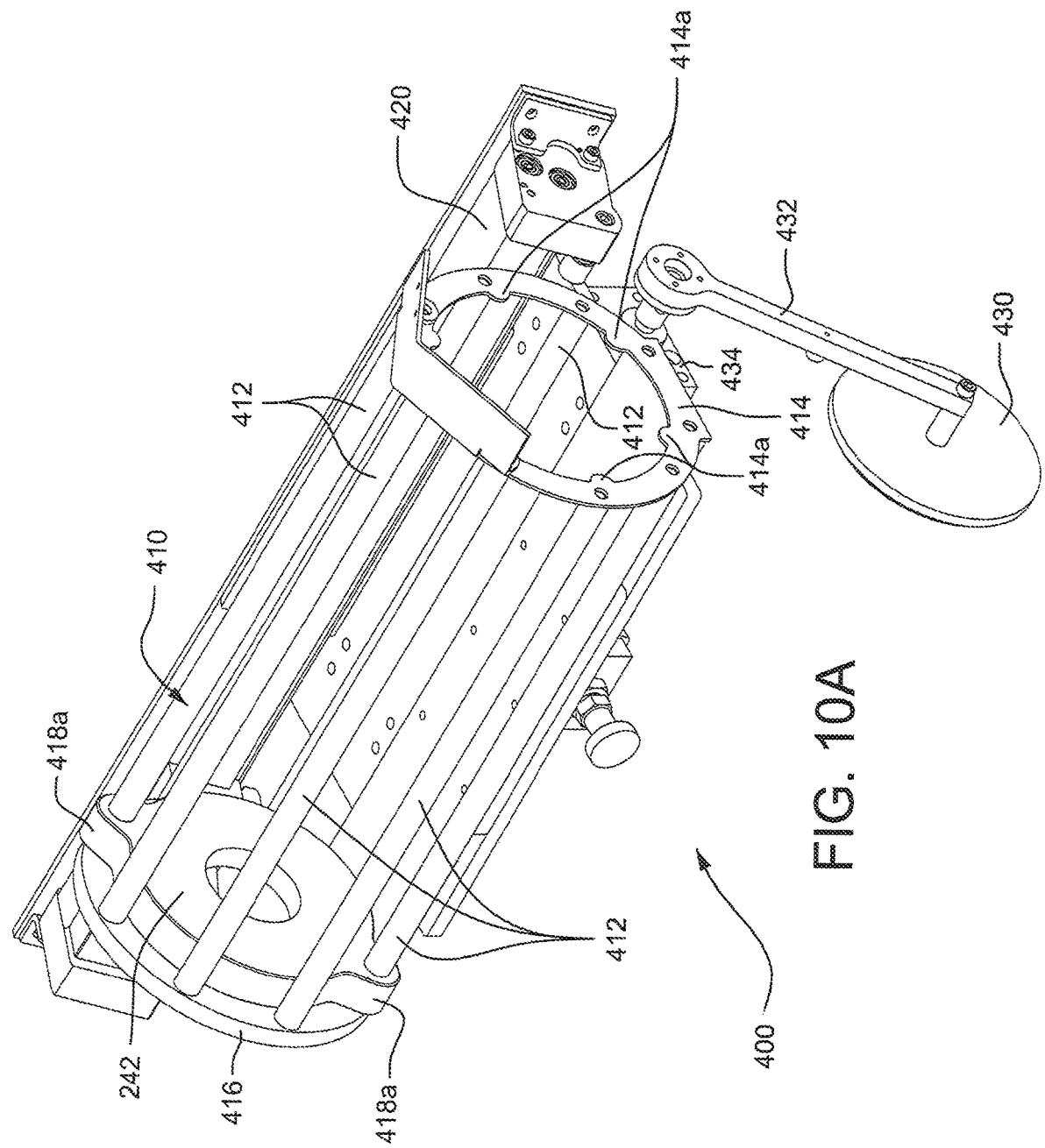
Figure 10B:
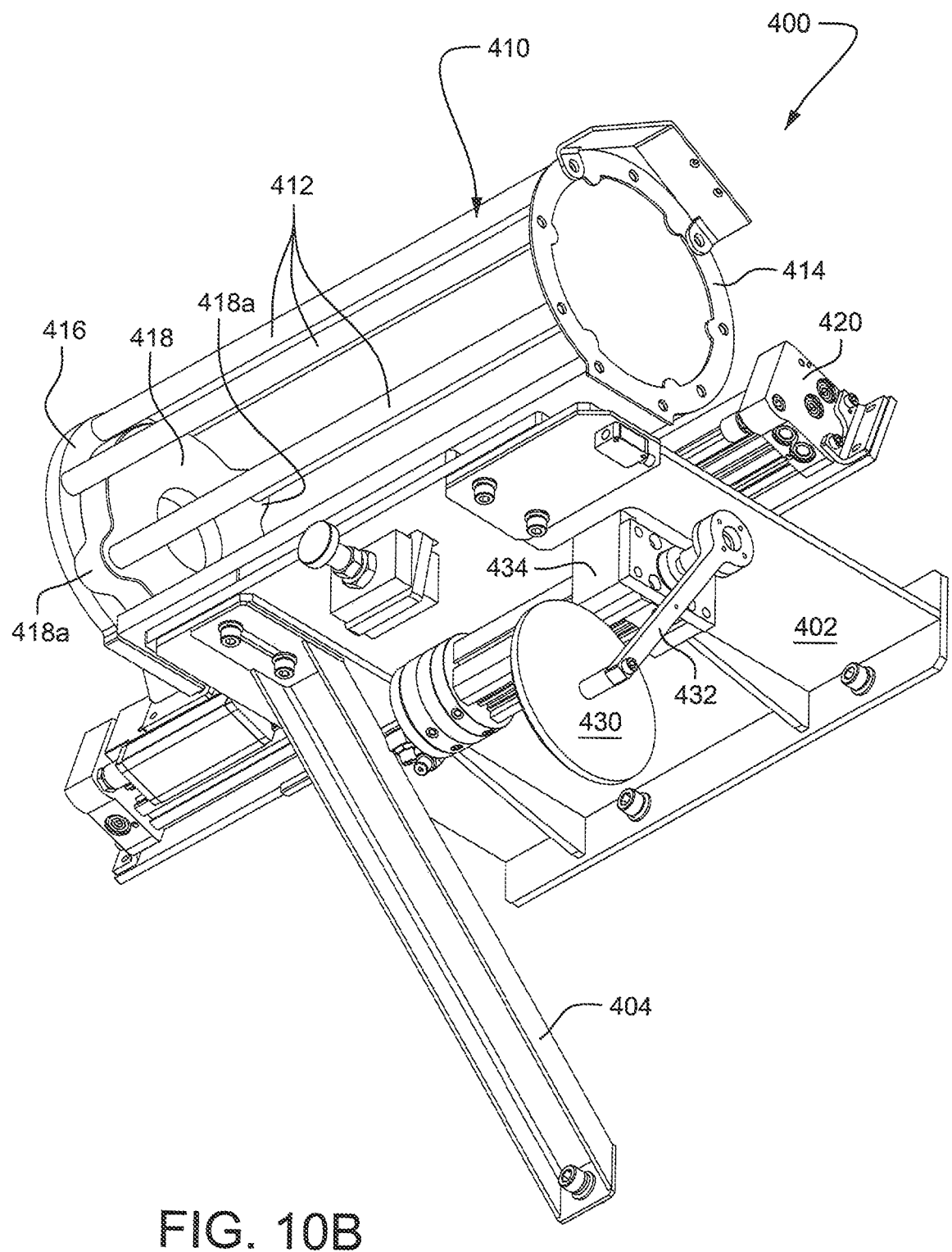
Figure 10C:
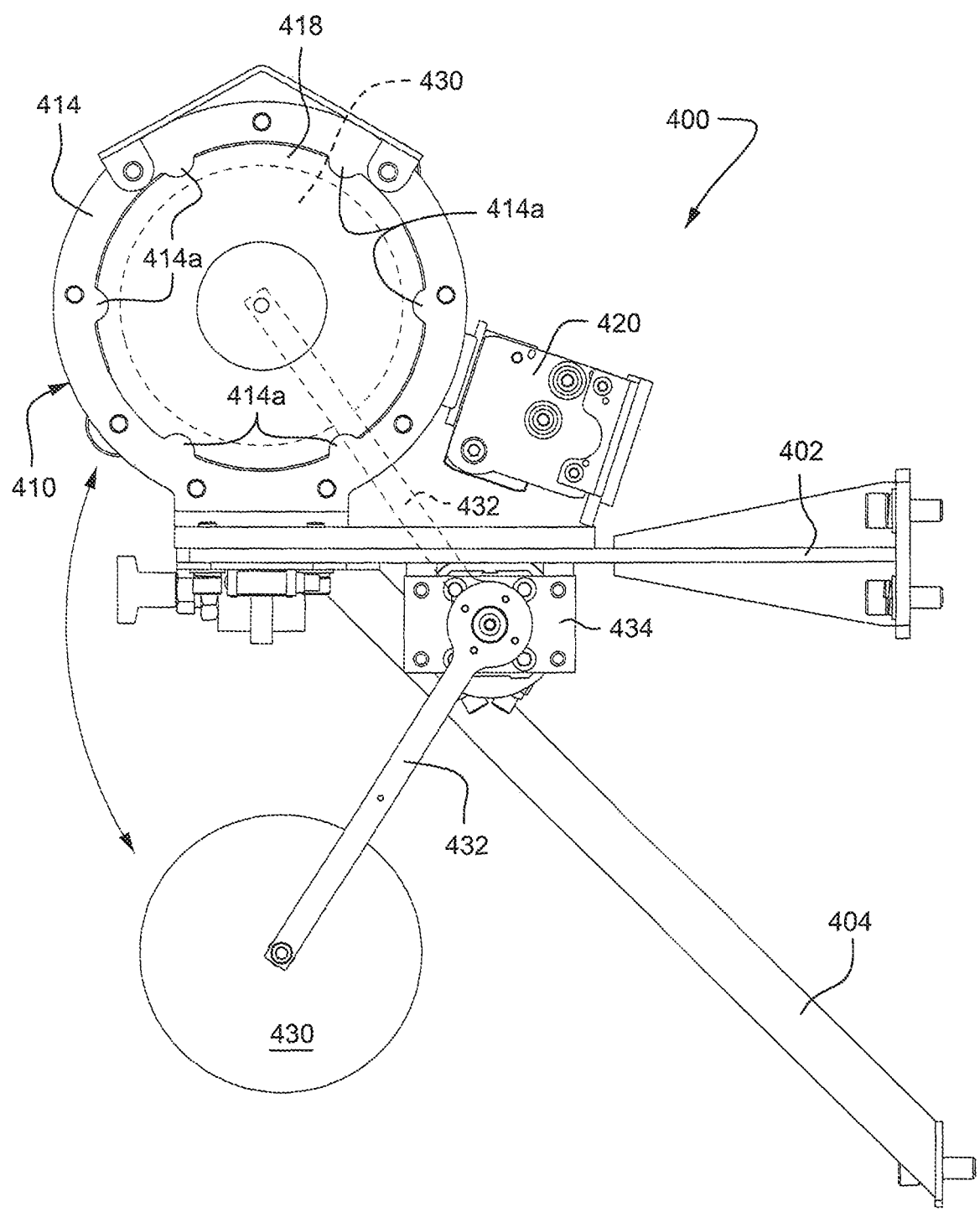
Figure 11B:
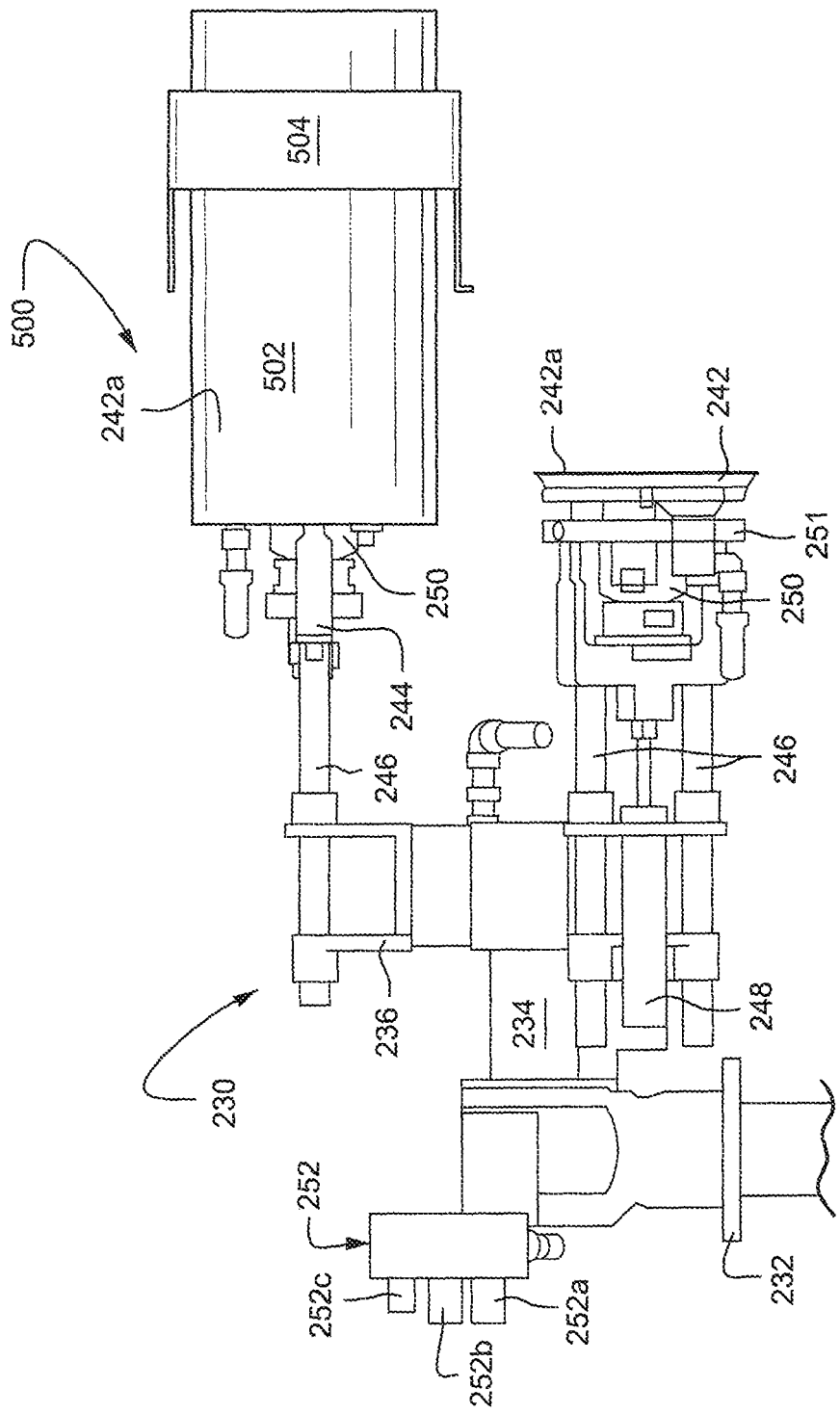

FIGS. 6A and 6B schematically show the operative association between the robotic hand assembly and a portion of the aircraft fuselage during exemplary sanding and rinsing operations;

FIG. 7 is a detailed front perspective view showing the sanding disc removal, replacement and cleaning systems associated with the robotic assembly;

FIG. 8 is an enlarged front perspective view of the sanding disc removal system associated with the robotic assembly;

FIGS. 9A-9E depict an operational sequence whereby a sanding pad is automatically removed from one of the sanding heads by the disc removal assembly associated with the robotic hand assembly;

FIGS. 10A-10C are enlarged side perspective, bottom perspective and front end elevational views, respectively, of the sanding disc replacement system associated with the robotic assembly; and FIGS. 11A-11B are top plan views showing a sequence of operation to clean a sanding disc associated with a sanding head of the robotic hand in the disc cleaning system.

DETAILED DESCRIPTION

Figure 1:
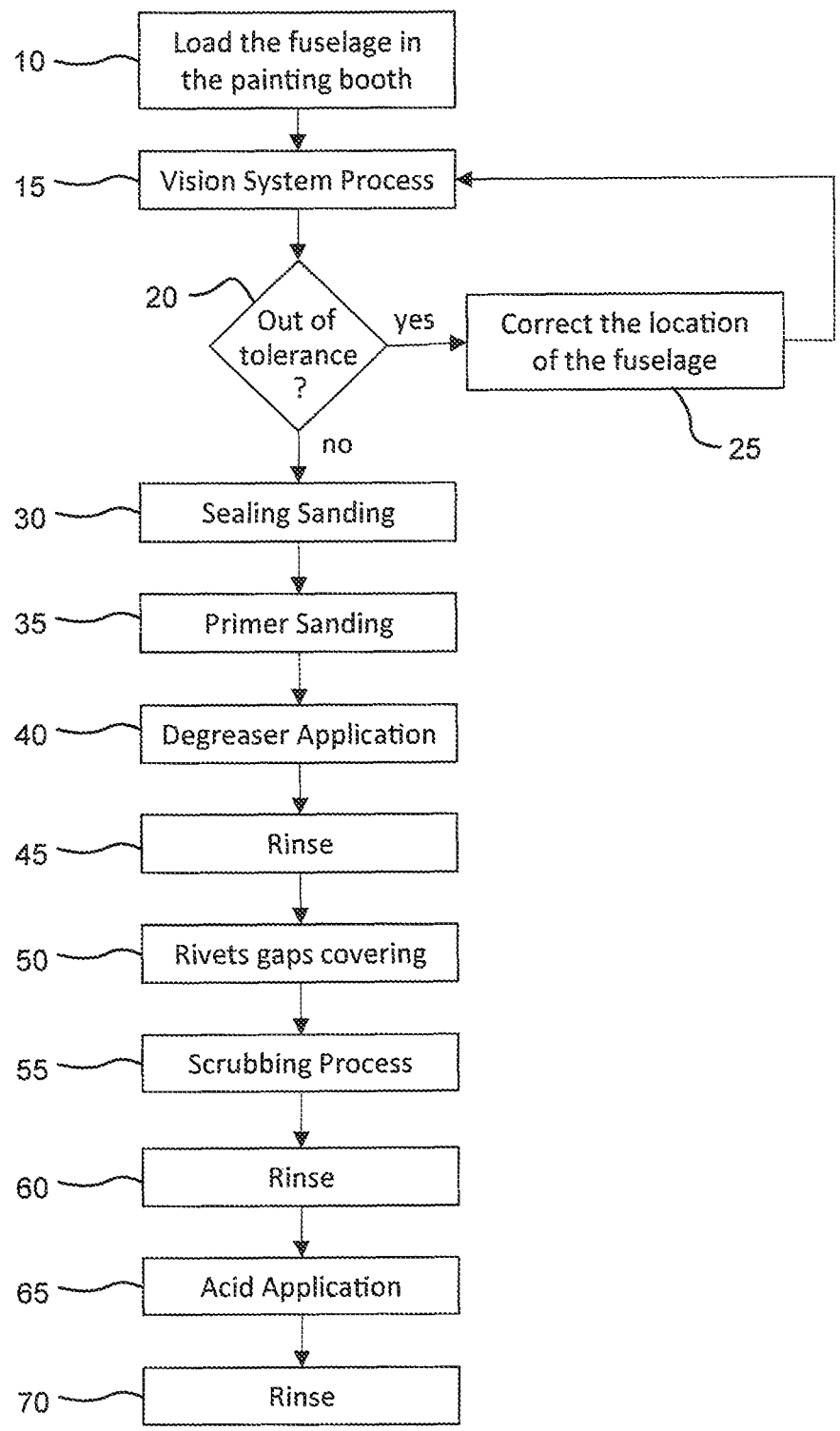
FIG. 1 is a flowchart of a fully automated aircraft fuselage painting surface preparation process showing an exemplary sequence of sub-process steps that may be employed according to an embodiment of the invention.

Accompanying FIG. 1 depicts an automated flow diagram for preparing an aircraft fuselage for painting. As shown, the process begins with step 10 by positioning the aircraft fuselage F within the paint preparation booth 100 (see FIGS. 2A and 2B). A camera vision system 390 (see FIG. 7) is located on the base of each robotic assembly 200a, 200b operably positioned on the port and starboard sides, respectively, of the fuselage F. The camera vision system 390 is thus used to detect minimal variations in fuselage location and calculate offsets to paths on the fly by the software associated of an operator interface monitor and computer/controller (not shown). The data collected by the camera vision system 390 is generated automatically when the fuselage F is located in the paint preparation booth 100 according to step 15 by movement of the robotic assemblies 200a, 200b relative to the fuselage (to be discussed further hereinbelow). When a variation is detected by the camera vision system 390 to be out of the tolerance according to step 15, the vision system 390 will send a signal according to step 20 indicative of the error. The operators are therefore alerted in step 25 to manually relocate the fuselage F within the paint preparation booth 100. The vision system 390 may then be caused to operate one more time per step 15 in order to find and correct the path of the robotic assemblies 200a, 200b. This process loop is continued until the location of the fuselage F within the paint preparation booth 100 is determined by to be approved by the camera vision system 390, following which the next stages of the process according to steps 30 through 70 are then released.

Figure 2B:
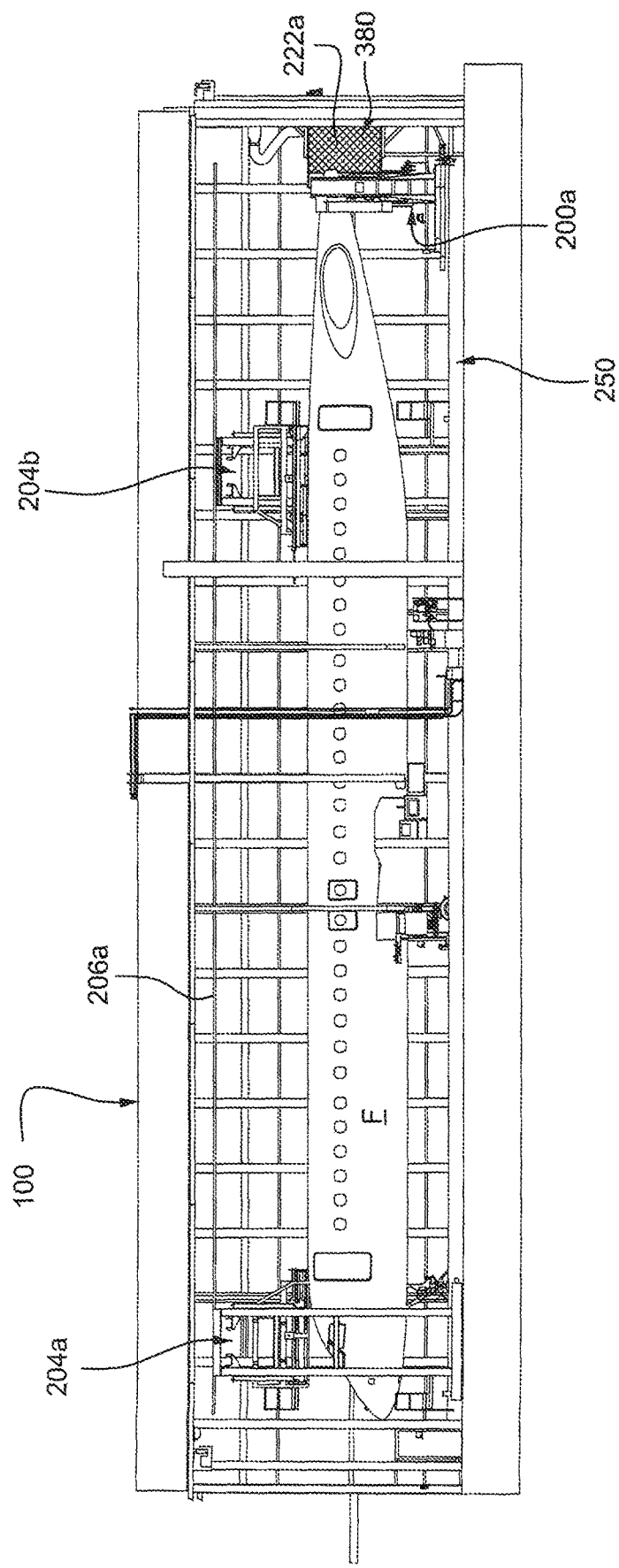

The fully automated processes according to an embodiment of the invention may be performed in a unique paint preparation booth 100 as depicted in FIGS. 2A and 2B which is sized and configured to accept therewithin the aircraft fuselage F. The paint preparation booth 220 includes a pair of anthropomorphic robotic assemblies 200a, 200b operatively moveable on parallel rails 202a, 202b positioned on the port and starboard sides of the fuselage F, respectively.

Figure 3A:
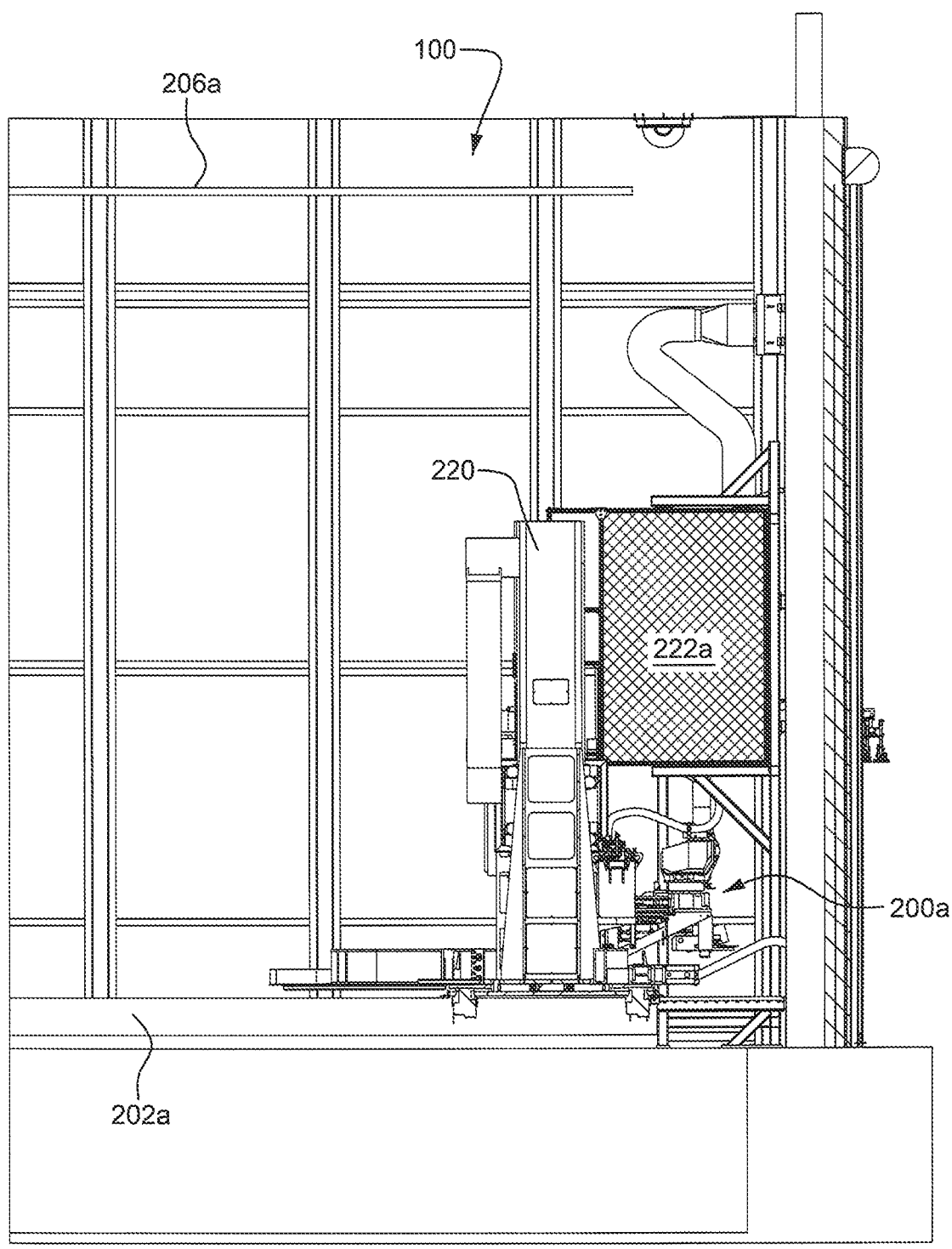
FIGS. 3A and 3B are enlarged side elevational and rear perspective views, respectively, of a protective enclosure associated with the fuselage surface painting preparation booth for housing a robotic assembly employed in the automated surface preparation system during a stand-by cycle.
Figure 3B:
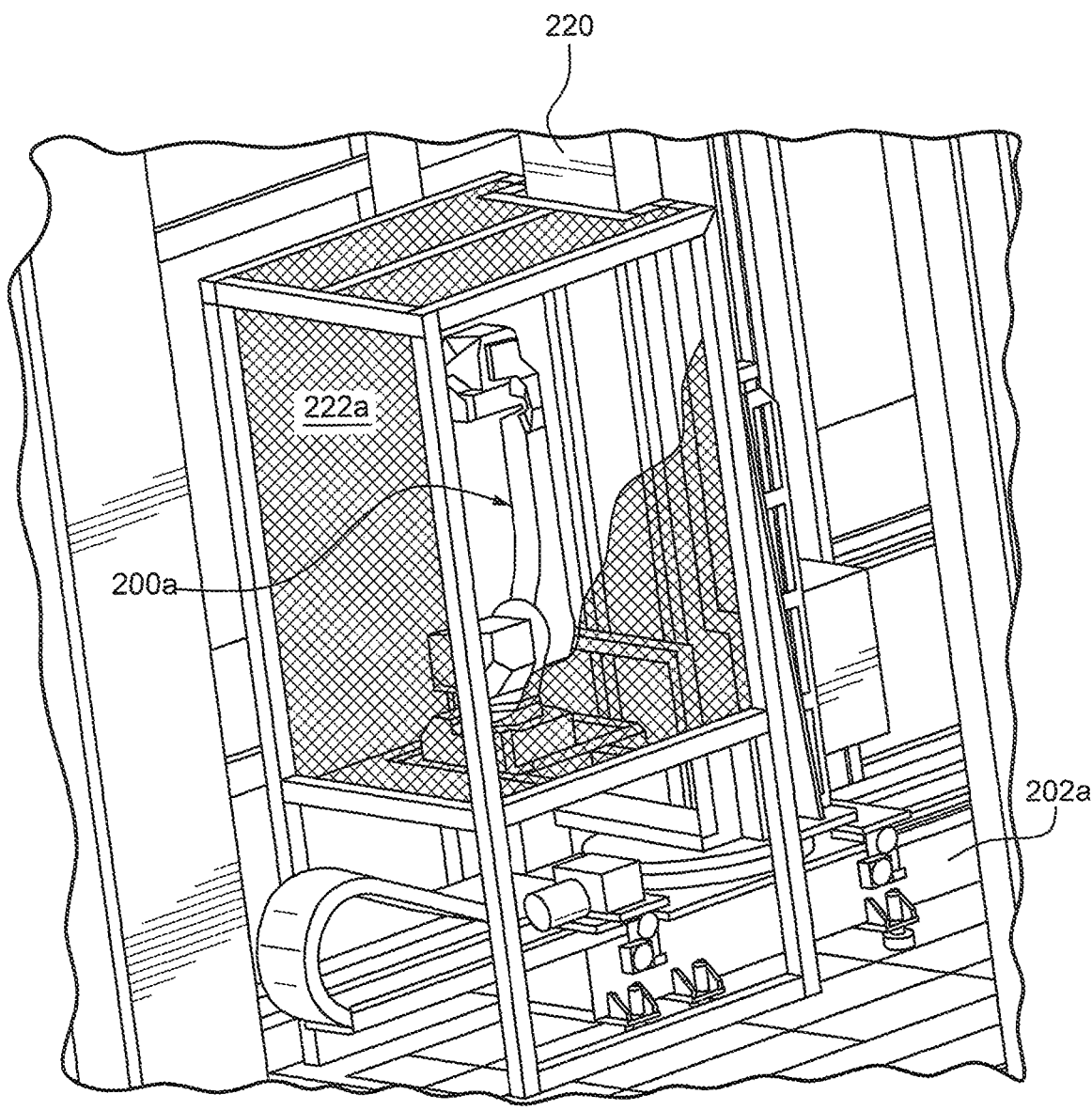

As such, each of the robotic assemblies 200a, 200b is capable of being rectilinearly traversed back and forth along the respective port and starboard sides of the fuselage F. The robotic assemblies are also mounted on a vertical pedestal 220 defining a z-lift axis (see FIGS. 3A and 3B). The robotic assemblies 200a, 200b may therefore be articulated relative to the z-axis defined by the pedestal 220, i.e., rotated about the z-axis as well as moving vertically upwardly and downwardly along the z-axis and towards and away from the z-axis so as to reach all circumferential areas of the fuselage F. This movement as well as the ability of the robotic assemblies 200a, 200b to be rectilinearly moved along the rails 202a, 202b will ensure that all surfaces of the fuselage F in its longitudinal direction are also accessed. In such a manner, therefore, the robotic assemblies 200a, 200b may be choreographed by the computer-controlled software so as to reach all external surface regions of the aircraft fuselage F positioned within the paint preparation booth 100.

The robotic assemblies 200a, 200b are operably responsive to command signals generated by preprogrammed offline software stored in a non-volatile memory of a computer control station 210a operatively connected to an operator control console 210b (see FIG. 2A). The computer control station 210a is thus capable of generating all paths and data for operation of the robotic assemblies 200a, 200b using a 3D model of the fuselage F based on operator input through the control console 210b. In this way all planning and operation of the robotic assemblies 200a, 200b are defined in an offline 3D environment that allows for improvement in each step of the process.

The paint preparation booth may also include port and starboard side man lifts 204a, 204b, suspended from overhead rails 206a, 206b to allow the lifts 204a, 204b to be rectilinearly traversed along the longitudinal axis of the fuselage F. The lifts 204a, 204b may also be raised and lowered relatively to the fuselage F. Such vertical and longitudinal movements of the lifts 204a, 204b will therefore allow human operators to access the fuselage prior to and after conducting the automatic surface preparation process (e.g., so as to mask/unmask windows or other fuselage openings, position the fuselage and the like).

The robotic assemblies 200a, 200b may be parked in a respective protective enclosure 222a, 222b when in a standby cycle of operation (i.e., when awaiting automated operation for surface preparation of the fuselage F). The enclosures 222a, 222b provide environmental protection for the operative components of the robotic assemblies 200a, 200b while awaiting further automated operation.

A suitable safety fence (not shown) may surround the preparation booth 100. For example, the safety fence may be included with sensors at each door for detecting intrusion into the booth 100 during an automatic operation. If any of the sensors detect human intrusion, for example, a shut-off signal may be sent by the sensor to the controller 210a to responsively initiate a complete and immediate system stop. Temperature sensors may also be employed in the protective enclosures 222a, 222b to protect the main components of the robotic assemblies 202a,202b during the drying cycle within the preparation booth 100.

The operator control console 210b allows an operator to visually follow the operations of the robotic assemblies 200a, 200b via the camera vision system 390. The operator control console 201b may suitably include a touch screen display that allows a user to interact with a processor therein and thus control the robot. The touch screen display suitably presents graphical user interface components (not shown) for allowing the user to, for example, control the application system; control the location of the robotic assemblies on their respective tracks; control the action of the robotic assemblies, e.g., select an automated process, send the robotic assembly to a safe "pause" position, control and view the speed of the robotic assembly, control and view pressure being applied by the robotic hands and the like; check the real time status of the process; check the position of the man lifts and/or check the status of the alarm fences.

Figure 4A:
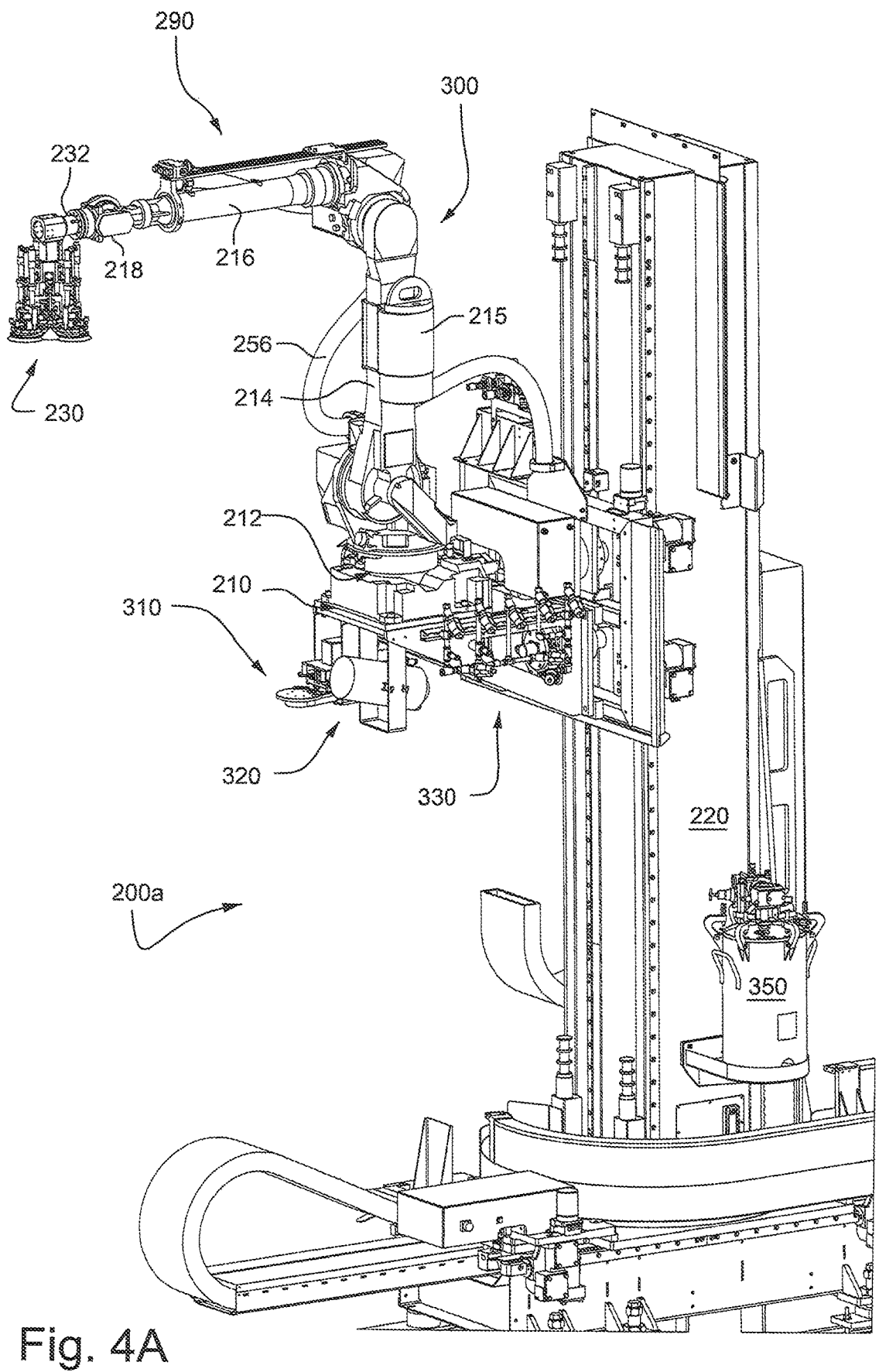
FIGS. 4A and 4B are side and rear perspective views, respectively, of an exemplary robotic assembly that may be employed in the fuselage surface painting preparation booth of FIGS. 2A and 2B.
Figure 4B:
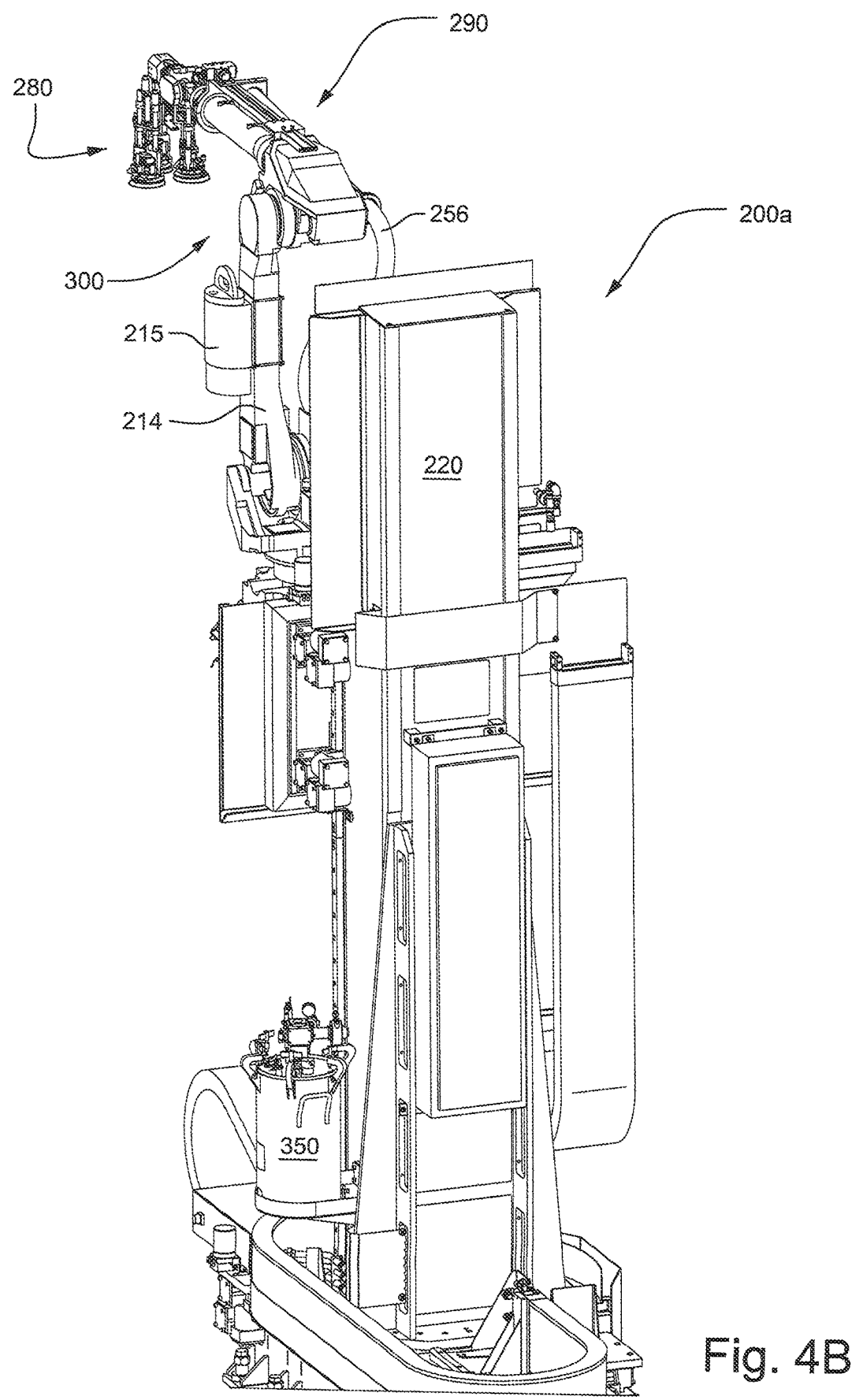

The port-side robotic assembly 200a and its related systems are depicted in greater detail in FIGS. 4A and 4B. The discussion which follows with respect to robotic assembly 200a is therefore to be understood as being applicable to the starboard-side robotic assembly 200b as both robotic assemblies 200a, 200b are mirror images of one another. In this regard, it will be observed that the robotic assembly 200a includes a platform 210 that is operatively coupled to the pedestal 220 for reciprocal vertical movements along the z-axis defined by the pedestal 220. The platform 210 carries a robotic swivel base assembly 212 operatively connected to a proximal end of the upper arm assembly 214 to allow pivotal movements therebetween. The distal end of the upper arm assembly 214 is in turn in pivotally connected to the proximal end of the forearm assembly 216. A wrist assembly 218 is rotatably provided at the terminal end of the forearm assembly 216. The robotic hand assembly 230 is operatively connected to the wrist assembly 218.

Figure 5A:
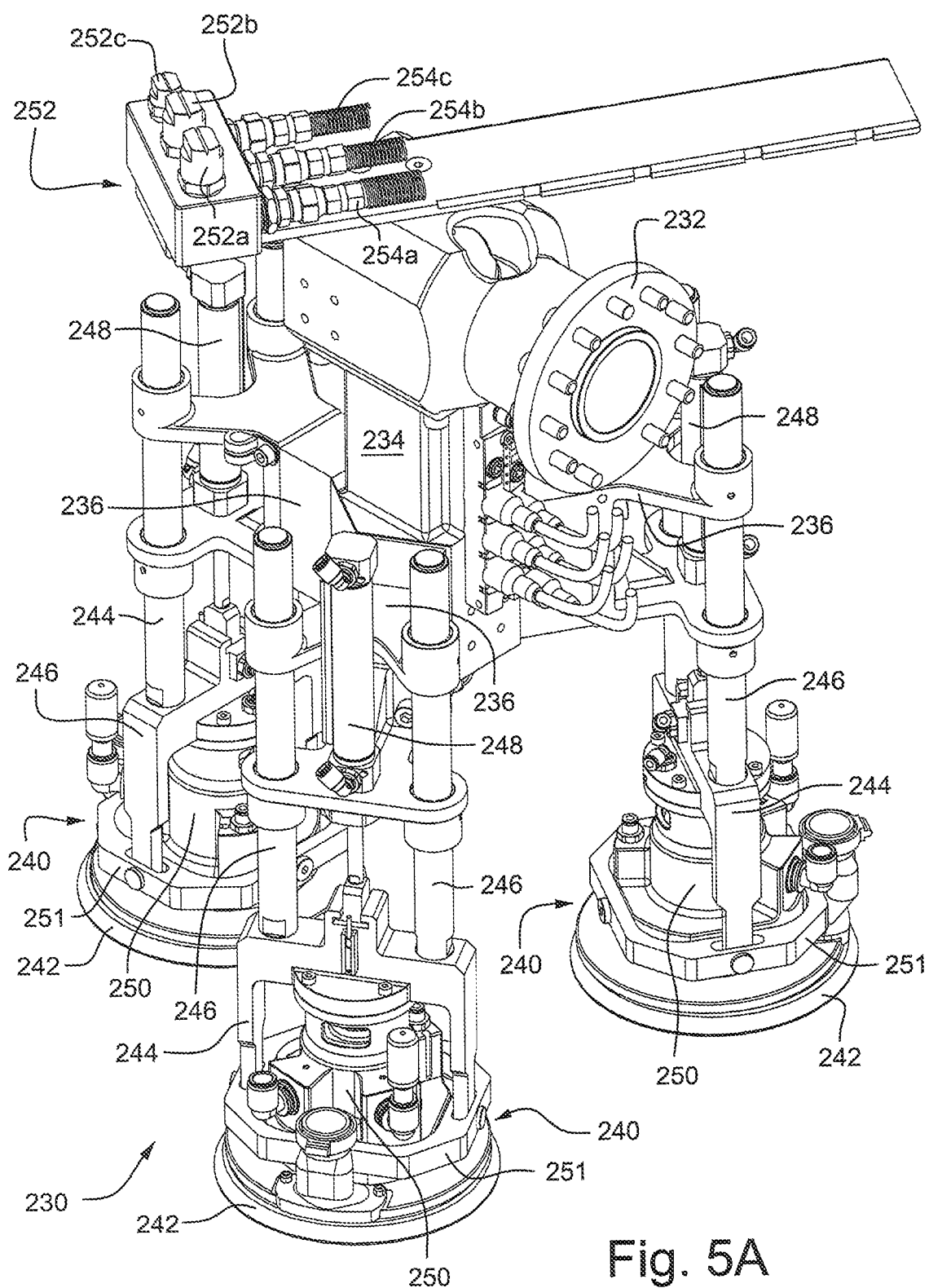
FIGS. 5A and 5B are enlarged top perspective side elevational views of a robotic hand that may be employed in the robotic assembly.
Figure 5B:
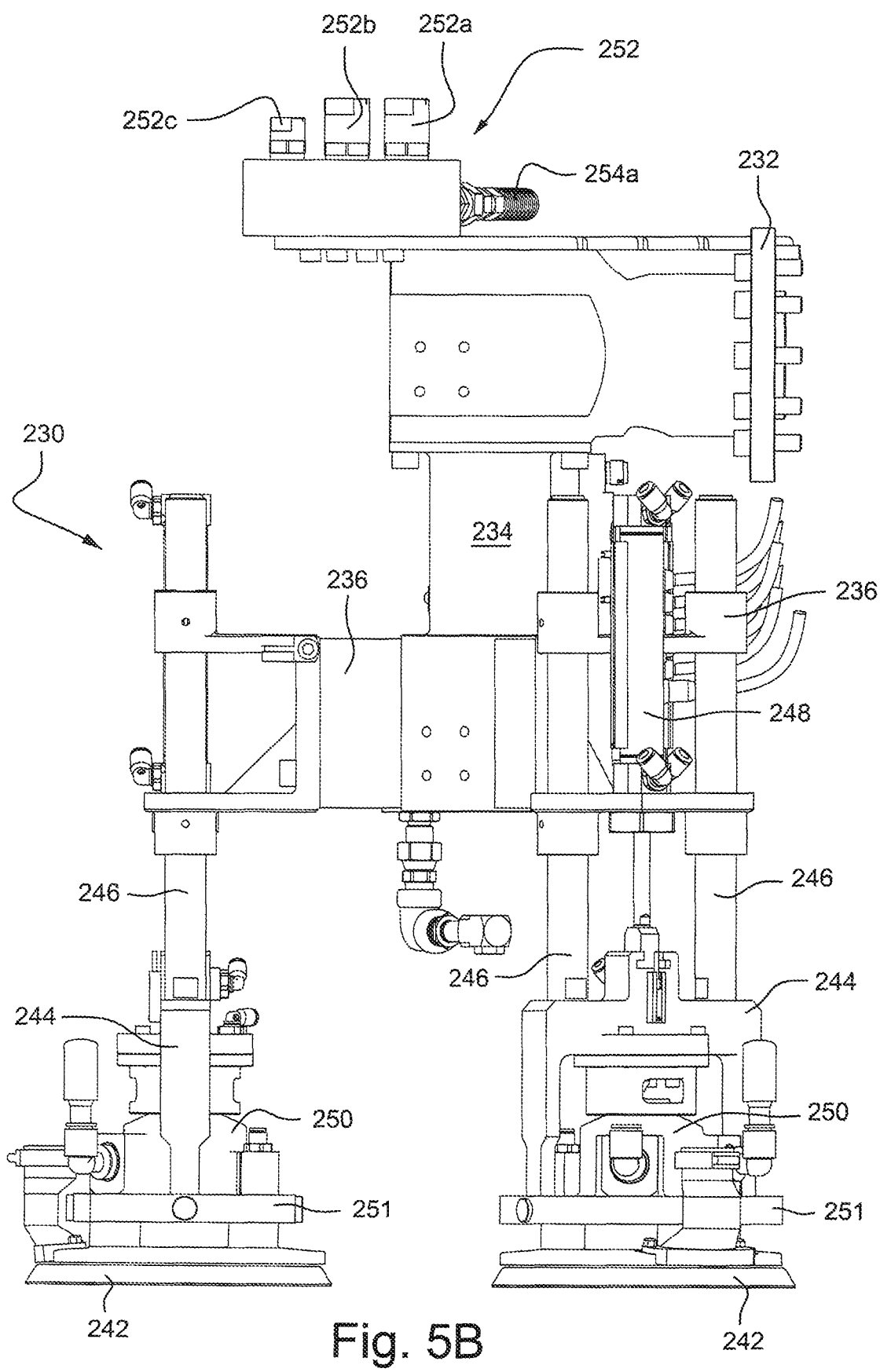

The robotic hand assembly 230 is depicted in greater detail accompanying FIGS. 5A and 5B. As shown therein, the hand assembly 230 includes a connection flange 232 so as to operatively connect the hand assembly 230 to the wrist assembly 218. A central control column 234 includes radially spaced-apart support brackets 236 each carrying a respective sanding head assembly 240. Each sanding head assembly is provided with an attachment pad 242 for an abrasive disc at a terminal end thereof. In preferred embodiments, the attachment pad 242 is comprised of a hook part of a two-part hook and pile fastener system (e.g., a VELCRO® hook and pile fastener system) to which an abrasive disc (e.g., a SCOTCHBRITE® abrasive disc, a VELCRO-brand hook and loop disc as well as different grit sandpapers) may be physically attached and removed in the manner to be described below.

Each of the sanding heads 240 is dependently carried by suitable yokes 244 attached to the distal ends of support tubes 246 which are in turn connected to a respective one of the radially separated support brackets 236. Pneumatically operated actuators 248 are carried by the support brackets 236 and are operatively connected to the mounting yokes 244 so as to allow individual movement of the sanding heads 240 towards and away from the fuselage surface during a sanding operation.

The attachment pads 242 are capable of independent rotation and operation. More specifically, each of the pads 242 is mounted to the yoke 244 at the terminal ends of a respective pair of guide rods 246 each being mounted for sliding reciprocal movements within the support brackets 236. The actuator cylinders 248 are also connected to each respective yoke 244 to drive the yoke 244, and hence the attachment pad 242 attached thereto, between extended and retracted positions relative to the support brackets 236. Rotation of each pad 242 is driven by a suitable motor 250 operatively carried by a base 251 attached to the yoke 244 and operatively connected to the associated pad 242. The pads 242 are therefore capable of being independently rotated and are independently subjected to force control against the fuselage F by virtue of being extended/retracted by the actuator cylinder 248. That is, only one or more than one of the pads 242 may be rotated and/or brought to bear against the surface of the fuselage F as may be required.

The sanding head 240 is capable of accommodating angles up to 10 degrees in any single direction to conform to contours that may exist on the surface of the fuselage F by virtue of a gimbaled connection between the yoke 244 connecting the base 251 to the support bracket 236. The gimbaled connection of the yoke 244 may also accommodate combined angles up to 7 degrees. Constant pressure is maintained on the head 240 by the pneumatic actuator cylinders 248. In this regard, when extension or retraction air is delivered to the actuator cylinders 248, the individual pads 230 may rise or fall to a programmable work pressure. Such functional flexibility allows sanding to be performed on the relatively complex and tight surface areas of the fuselage F. The pads 242 may be provided with different types of abrasive material discs, such as s SCOTCH BRITS® abrasive discs, VELCRO-brand hook and loop discs as well as different grit sandpapers. Each abrasive material has its individual function for individual sub-process that allow the automated system to perform the preparation of the fuselage surface properly.

The central control column 234 of the robotic wrist 230 also carries a spray nozzle assembly 252 that includes individual nozzles 252a. 252b and 252c each of which is fluid-connected to a supply line 254a, 254b and 254c, respectively, to a source of supply (not shown) of a liquid to be dispensed against the surface of the fuselage F during surface preparation for painting (e.g., a degreaser solution applied in step 40 of FIG. 1, an acid wash solution applied in step 65 of FIG. 1, and/or rinse water applied in steps 45, 60 and 70 of FIG. 1). In this regard, FIGS. 6A and 6B schematically depict the manner in which the attachment pads 242 and the abrasive discs carried thereby associated with the robotic hand 230 may be brought to bear against the surface of the fuselage, followed by application of a suitable post-sanding liquid via the nozzle assembly 252.

An aerodynamic sealing sanding process may be performed in all seal areas on the exterior surface of the fuselage F according to step 30 (see FIG. 1). The principal function of the sealing sanding process in step 30 is to improve the final quality of the sealing and avoid depressions and defects on the sealing seams. The automated system may therefore use VELCRO-brand pads because they exhibit more resistance and do not scratch the seams and also do not require automated pad changes. The pads 242 may be operated independently of the other pads 242 so that some of the pads 242 may be periodically rested in an inoperative position in order to avoid abrasion degradation. The force against the fuselage surface F is controlled by the pneumatic cylinders 248 that can be operated independently. AU dust generated during sanding may be collected by a vacuum operated collection system 256 that is located on the robot arm and is connected to a source of vacuum 215 (see FIGS. 4A and 4B) associated with the robotic assembly 200a.

The primer sanding process of step 35 is performed on the areas where the primer has been previously painted so as to activate the primer film coating to allow it to receive additional new primer. The robotic assemblies 200a, 200b are preprogrammed to remove a very fine film by using conventional sandpaper discs that may be automatically removed in the manner discussed below so as to allow a new sanding disc to be used when the previous sanding disc has deteriorated. The force control and the speed of the robot motion is controlled to define the total film thickness that will be removed by the automated process. Due to the features on the fuselage F, a single head may be used individually to avoid collision on the others fuselage areas.

The degreaser application in step 40 of FIG. 1 is the process that will remove the protective film of the fuselage before the scrubbing process. The degreaser liquid is sprayed in high pressure and in high temperature via one of the nozzles 252a-252c in order to melt the protective film of the fuselage F. The robotic hand assembly 230 may thus be caused rotate in order to direct the pressurized flow of degreaser liquid onto the surface of the fuselage F (i.e., as schematically depicted by FIG. 6B). The application of the degreaser liquid may be performed circumferentially around the fuselage F with rinse water being applied thereafter in a longitudinal direction of the fuselage F in order to prevent the degreaser from drying and staining the surface of the fuselage F.

A full rinse with water may then be applied on the complete fuselage F in step 45 so as to remove all remaining sanding dust from the surface. The robotic assemblies 200a, 200b may be operated individually in the longitudinal position with the robotic hand being rotated in a direction away from the fuselage F to allow the application of high pressure water stream to the surface of the fuselage F via one of the nozzles 252a-252c.

The rivet gap covering process is practiced in step 50 of FIG. 1 by the application of solventless paint into the gaps in order to cover the complete gaps and improve the quality of the final painting. At this step, special discs may be installed onto the attachment pads 242 with the pumping system supplying one of the nozzles 252a-252c being filled with the paint. The robotic assemblies 200a, 200b may therefore be commanded to move to the all junctions of the fuselage F where the rivets are installed. In addition, an automated wiping process may be performed in order to remove the remaining paint that may be on the surface of the fuselage F.

The scrubbing process is performed in step 55 so as to scrub the entire surface of the fuselage 270. It is preferred that SCOTCH BRITE® abrasive disc be employed on the attachment pads 242 of the sanding heads 230 and moved across the surface of the fuselage F in and up and down manner simultaneously with a warm degreaser being supplied by one of the nozzles 252a-252c to melt the dust and help with the cleaning. Water may also be applied after few stokes in order to avoid any staining should the degreaser dry on the surface. The abrasive disc may be cleaned by a disc cleaning system 500 to be discussed below in order to clean the pad during the automated process of this step. The movements of the robotic hand 230 are coordinated up and down, forward, and backward relative to the fuselage longitudinal axis.

A full rinse with water may again be applied onto the entire surface of the fuselage F in step 60 in order to remove all remaining dust from the surface. The robotic assemblies 200a, 200b are operated individually in the longitudinal direction of the fuselage F with the attachment pads 242 directed away from the fuselage F to thereby allow the water rinse to be dispensed from one of the nozzles 252a-252c.

The application of an acid wash solution is performed in step 65 so as to protect the fuselage F surface against corrosion. The tank 350 (see FIGS. 4A and 4B) containing the acid wash solution is provided on the pedestal 220 which it may be filled before conducting the acid was step. The robotic hand 230 may be positioned so as to apply a spray of the acid solution from the tank 350 onto the surface of the fuselage F via one of the nozzles 252a-252c. Water may also be applied intermittently through another one of the nozzles 252a-252c to avoid staining.

The final full rinse with water may thereafter be practiced in step 70 so as to rinse the entire surface of the fuselage F so as to remove any remaining acid solution from its surface. The robotic assemblies 200a, 200b are operated individually in the longitudinal direction of the fuselage F with the attachment pads 242 directed away from the fuselage F to thereby allow the water rinse to be dispensed from one of the nozzles 252a-252c.

As can be seen in accompanying FIG. 7, the robotic platform 210 also supports an abrasive disc removal system 300, an abrasive disc replenishment system 400 and an abrasive disc cleaning system 500, each of which will be discussed separately below in relation to their operative relationship to the robotic hand assembly 230.

The abrasive disc removal system 300 is depicted in greater detail in accompanying FIG. 8 as comprising a housing 302 to which is attached a disc-shaped target platform 304 projecting forwardly therefrom. The housing 302 may be physically suspended from the platform 210 by a U-shaped mounting bracket 303. The support pad 304 includes a plurality of apertures 304a to allow for the discharge of pressurized air and thereby clear a removed abrasive disc from the surface of the target platform 304. A circumferentially separated pair of edge alignment guides 306 are positioned rigidly near a perimetrical edge region thereof to assist in the alignment of the pad 242 on the target platform 304 during a disc-removal operation.

A reciprocally movable finger element 308 is provided at a forward end of the housing 302 and extends over the perimetrical edge region of the support pad 304. The finger element 308 is movable by a suitable solenoid actuator 310 so as to be moveable between a raised position wherein the finger element 308 is spaced above the surface of the support pad 304, and a lowered position wherein the finger element 308 is brought into engagement with and edge portion of the abrasive disc attached to the attachment pad 242 positioned on the target platform 304 so as to immovably pinch such edge portion against the surface of the target platform 304. When in the lowered position, therefore, the finger element 308 will positionally fix and hold the abrasive disc onto the target platform 304.

Figure 9A:
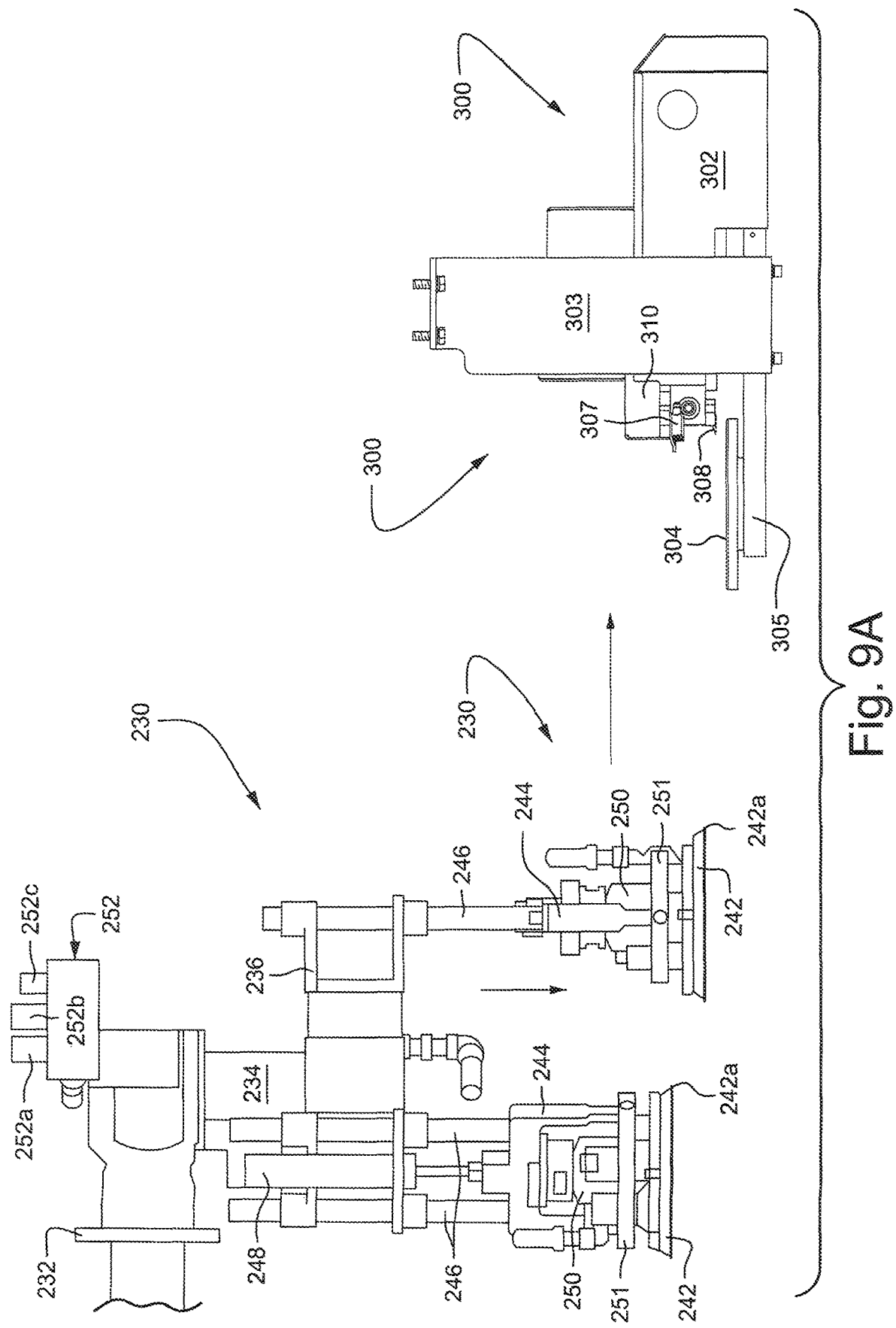
Figure 9B:
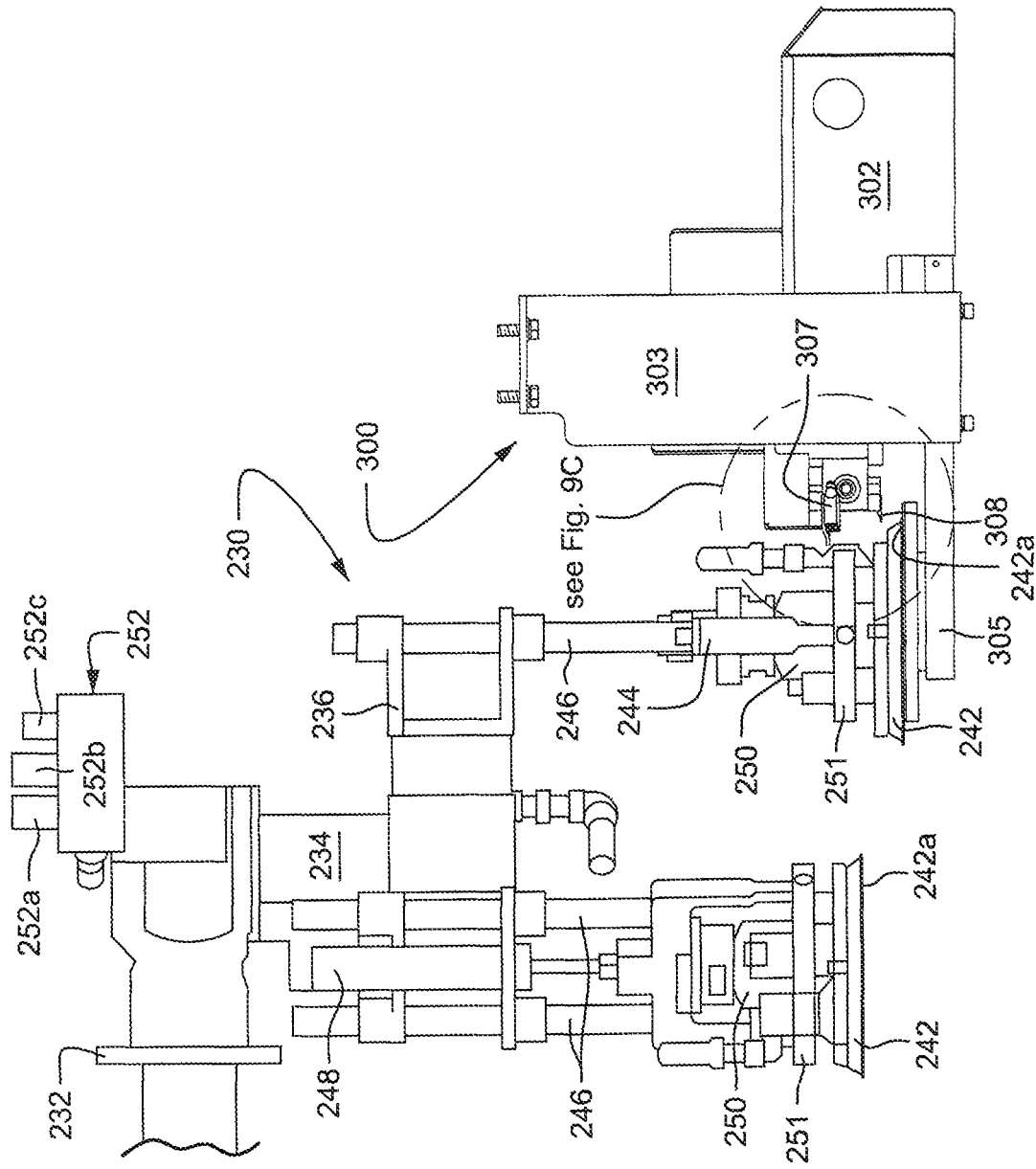

When it is necessary to replenish an exhausted abrasive disc attached to the pads 242 of the robotic hand 230 with an unused abrasive disc, the robotic hand 230 will be maneuvered as shown in FIG. 9A so that one of the pads 242 and its associated abrasive disc 242a attached to the underside thereof is brought into position onto the target platform 304 as shown by FIG. 9B. The automated positioning of the pad 242 onto the surface of the target platform 304 is aided by suitable sensors 307. It will be noted that the diameter of the abrasive disc 242a is somewhat larger than its associated disc attachment pad 242 so that an annular perimetrical edge region extends beyond the perimetrical edge of the pad 242. During this time, the finger element 308 will be in its raised position so as to define a space to accept such annular perimetrical edge region of the abrasive disc 242a.

Figure 9D:
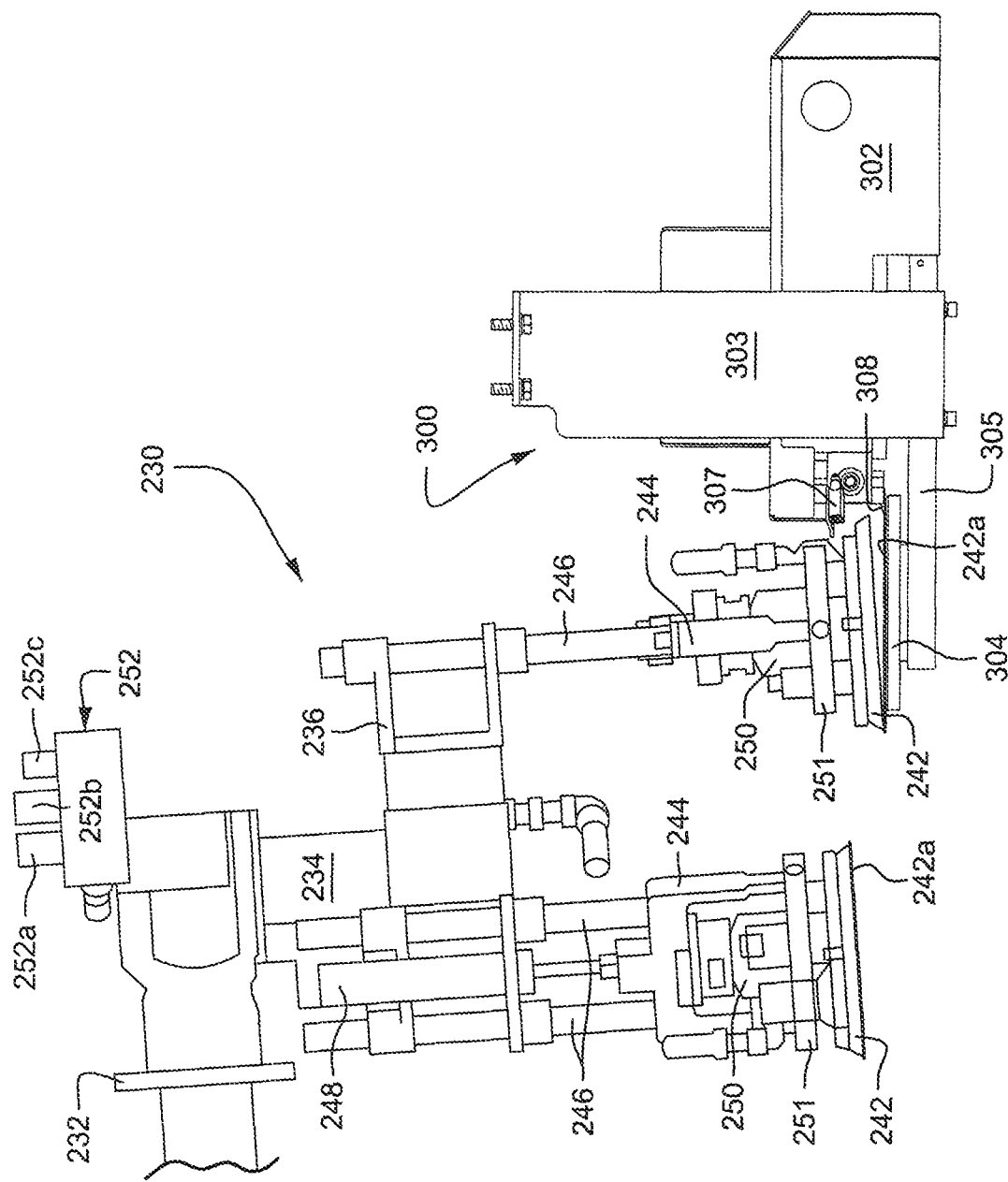

Once pad 242 and the abrasive disc 242a have been properly positioned onto the target platform 304 (as confirmed by suitable position sensors (not shown)), the finger element 308 may be commanded to move from its raised position (shown by the dashed lines in FIG. 9C) and into its lowered position whereby the annular perimetrical edge region of the abrasive disc is physically pinched and thus positionally captured against the surface of the target platform 304. Such a captured state is shown in FIG. 9C. Thereafter, the robotic hand 230 may be tilted rearwardly away from the removal system 300 which in turn causes the abrasive disc 242a to be peeled off or stripped from the attachment surface of the pad 242 as shown in FIG. 9D. Continued withdrawal of the robotic hand 230 away from the removal system 300 as shown in FIG. 9E will leave the removed abrasive disc 242 positioned on the surface of the target platform 304. At this point in the cycle, the finger element 308 may be commanded to be moved into its raised position at which time pressurized air can be caused to be jetted from the apertures 304a so as to discard the abrasive disc 242a by blowing it off and away from the support pad 304 where it can be later collected by an operator. A similar abrasive disc-changing operation could thus be performed for the other abrasive discs 242a on the other pads 242 as may be needed and/or required.

Once the abrasive discs 242a have been removed from the attachment pads 242 by the disc removal system 300, the robotic hand 230 may be maneuvered relative to the abrasive disc replenishment system 400 supported by a lateral mounting table 402 attached along an edge thereof to the platform 210 and supported by a brace 404 (see FIG. 7) so that unused abrasive discs may be physically attached to individual ones of the attachment pads 242. The disc replenishment system 400 is shown in greater detail in accompanying FIGS. 10A-10C.

As can be seen in FIGS. 10A-10C, the disc replenishment system 400 generally includes a cylindrical sleeve cage 410 formed by circumferentially spaced apart parallel guide rods 412 extending between forward and rearward end rings 414, 416, respectively. The sleeve assembly is sized and configured to accept therewithin a stack of abrasive discs (not shown in FIGS. 10A-10C) that provide an available stand-by supply for replenishment on the attachment pads 242 when needed. The stack of abrasive discs are thus positioned against the sleeve base member 418 which is slideably attached to opposed respective ones of the guide rods 412 by slide bosses 418a. The sleeve base 418 is operatively connected to an actuator assembly 420 so as to allow reciprocal sliding movement of the base 418 within the sleeve cage 410.

A disc-shaped shutter element 430 is attached at a distal end of a shutter arm 432 located at the forward (open) end of the sleeve cag 410. The proximal end of the shutter arm 432 is in turn connected to the shutter actuator 434 so that the shutter arm 432 and the shutter element 430 attached at the distal end thereof is pivotally movable from a stand-by position shown in solid line in FIG. 10C (whereby the shutter element 430 is spaced from and thereby does not close the open end of the sleeve cage 410 at the forward end ring 414), and an operative position shown in dashed line in FIG. 10C (whereby the shutter element 430 is positioned at the forward end of the sleeve cage 410 at the forward end ring 414 so as to shutter or close the same).

In use, the robotic hand 230 may be maneuvered so as to coaxially align one of the attachment pads 242 with the sleeve cage 410, The abrasive discs will be positioned in a stack within the sleeve cage 410 such that the back side of a forwardmost one of the abrasive discs in the stack is exposed at the open end of the sleeve cage 410. The stack of abrasive discs are positionally maintained within the sleeve cage 410 by a series of radially spaced apart disc-retaining lobes 414a protruding inwardly from the forward end ring 414. Thus, the forwardmost abrasive disc in the stack is caused to bear slightly against the disc-retaining lobes (a representative few of which are identified by reference numeral 414a in FIGS. 10A-10C) thereby presenting it in a stand-by position for pick-up by the next available attachment pad 242 when needed.

The pad 242 and the back side of the abrasive discs are such that they may be removably joined to one another by contact (e.g., by providing the back side of the abrasive pad with a suitable adhesive material or providing each with one part of a two-part hook-and-loop fastener system (e.g., VELCRO-brand fasteners). Continued coaxial movement of the pad 242 toward the open end of the sleeve cage 410 will thereby eventually cause the pad 242 and the back side of the forwardmost abrasive disc in the stack within the sleeve cage 410 to contact one another. The abrasive disc may then be adhered to the pad 242 and separated from the stack of abrasive discs within the sleeve cage 410 when the robotic hand is withdrawn away from the sleeve cage 410.

Once the robotic hand has been withdrawn away from the stack of abrasive discs within the sleeve cage 410, the stack may be repositioned within the sleeve cag 410 so that the next one in the stack is placed against the disc-retaining lobes 414a and thereby readied for pick-up by another one of the attachment pads 242. In this regard, the shutter actuator 234 will be activated to cause the shutter arm 232 and the disc-shaped shutter element 230 to be rotated from its inoperative position (shown by solid lines in FIG. 10C) and into its operative position (shown by dashed line in FIG. 10C).

While in its operative position, the actuator assembly 420 may be activated so as to advance the sleeve base member 418 and hence the stack of abrasive pads within the sleeve cage 410 towards the shutter 430. The shutter 430 thereby provides a lid or sorts to allow the stack of abrasive discs within the sleeve cage 410 to be compressed somewhat to facilitate pick-up of the forwardmost disc by the next available attachment pad 242. Once the stack of abrasive discs have been repositioned and compressed by forwardly advancing the sleeve base member 418, the actuator 434 can again be operated to as to rotate the shutter arm 432 to cause the shutter 430 carried at the distal end thereof to move into its inoperative position. This sequence of operation may be repeated each time after a disc pick-up by an attachment pad 242 or may be repeated when the sensors determine that the compression of the stack of abrasive discs is below a threshold value.

There may be instances in the surface preparation process for the fuselage F whereby disc replenishment is not necessary. Instead, it may only be necessary to periodically clean the abrasive discs carried by the attachment pads 242. In those instances where only cleaning is required, the robotic hand may be maneuvered so that one of the attachment pads 242 and the abrasive disc carried thereby is coaxially aligned with a cleaning canister 502 associated with the abrasive disc cleaning system 500 as shown by FIG. 11A. Continued advanced of the coaxially aligned attachment pad 242 and the cleaning canister 502 will thereby allow the pads 242 to be positioned within the canister 502 as shown by FIG. 11B.

The cleaning canister 502 is dependently attached to the platform 210 by a U-shaped mounting bracket 504 so that the canister 502 is angled upwardly (see FIG. 7). The cleaning canister 502 is preferably an open-ended cylinder which is sized so as to receive the attachment pad 242 in slight friction fit relationship. Thus, when the attachment pad 242 is inserted into the cleaning canister 502 a fluid seal is established between the perimetrical edge of the pad 242 and the interior cylindrical surface of the canister 502. Once the pad 242 is positioned within the cleaning canister 502, the system may be activated to cause pressurized streams of cleaning fluid (e.g., water, organic cleaning liquid, dilute acid solution or the like) to be discharged through nozzles (not shown) within the canister to thereby clean the abrasive disc on the pad 242. Run-off cleaning fluid may be removed from the canister by a suitable drain line (not shown) which is aided by virtue of the inclined mounting position of the canister relative to horizontal. This disc-cleaning process may be repeated with other abrasive discs associated with other attachment pads as may be required.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A process for preparing a vehicle surface for painting comprising the steps of:
    (a) providing a preparation booth which is sized and configured to house a vehicle having the vehicle surface, wherein the preparation booth includes at least one robotic assembly which is reciprocally movable within the preparation booth relative to a longitudinal axis of the vehicle, the robotic assembly comprising a robotic hand having at least one abrasive disc attached to an attachment pad of the robotic hand, and at least one nozzle for discharging a stream of rinse fluid;
    (b) positioning the vehicle having the vehicle surface to be prepared for painting within the preparation booth;
    (c) operating the at least one robotic assembly to cause the at least one abrasive disc of the robot hand to abrade the surface of the vehicle;
    (d) maneuvering the robotic hand so that the at least one nozzle is directed toward the abraded vehicle surface and discharging the stream of rinse fluid through the at least one nozzle and towards the abraded surface of the vehicle so as to rinse the abraded surface of particulate matter;
    (e) providing the robotic assembly with an abrasive disc removal assembly for removing an exhausted abrasive disc from the attachment pad of the robotic hand;
    f) maneuvering the robotic hand relative to the abrasive disc removal assembly to remove the exhausted abrasive disc from the attachment pad of the robotic hand;
    (g) providing a disc replenishment assembly having a stack of unused abrasive discs to allow attachment of a forwardmost one of the unused abrasive discs onto the attachment pad of the robotic hand; and
    (h) maneuvering the robotic hand relative to the disc replenishment assembly so as to coaxially align the attachment pad thereof with the stack of unused abrasive discs, and bringing the attachment pad into contact with the forwardmost one of the unused abrasive discs in the stack so as to cause the forwardmost one of the unused abrasive discs in the stack to become physically attached to the attachment pad of the robotic hand, and thereafter
    (h1) moving a shutter element into an operative position to close a forward open end of a cylindrical sleeve cage; and
    (h2) operating a sleeve base member within the sleeve cage so as to press the stack of unused abrasive discs against the shutter element and thereby reposition the stack of unused abrasive discs within the cylindrical sleeve cage.

2. The process according to claim 1, wherein steps (c) and (d) are alternately repeated.

3. The process according to claim 1, wherein step (f) comprises:
    (f1) positioning the abrasive disc attached to the attachment pad of the robotic hand onto a target platform of the disc replenishment system;
    (f2) operating a finger element of the disc replenishment system to cause the finger element to engage a perimetrical edge region of the exhausted abrasive pad and thereby positionally capture the exhausted abrasive disc against the target platform; and
    (f3) operating the robotic hand to tilt the attachment pad away from the finger element while the exhausted abrasive pad is positionally captured against the target platform to thereby strip the exhausted abrasive disc from the attachment pad of the robotic hand.

4. The process according to claim 3, which further comprises eliminating the exhausted abrasive disc from the target platform by disengaging the finger element from the perimetrical edge of the exhausted abrasive disc, and thereafter causing pressurized air to be discharged through apertures in the target platform to thereby blow the exhausted abrasive disc away from the target platform.

5. The process according to claim 1, wherein step (b) is practiced by observing an initial position of the vehicle in the preparation booth using a video vision system associated with the at least one robotic assembly, and thereafter repositioning the vehicle in the preparation booth should any positional misalignment be detected.

6. A process for preparing a vehicle surface for painting comprising the steps of:
    (a) providing a preparation booth which is sized and configured to house a vehicle having the vehicle surface, wherein the preparation booth includes at least one robotic assembly which is reciprocally movable within the preparation booth relative to a longitudinal axis of the vehicle, the robotic assembly comprising a robotic hand having at least one abrasive disc attached to at least one attachment pad of the robotic hand, and at least one nozzle for discharging a stream of rinse fluid;
    (b) positioning the vehicle having the vehicle surface to be prepared for painting within the preparation booth;
    (c) operating the at least one robotic assembly to cause the at least one abrasive disc of the robot hand to abrade the surface of the vehicle;
    (d) maneuvering the robotic hand so that the at least one nozzle is directed toward the abraded vehicle surface and discharging the stream of rinse fluid through the at least one nozzle and towards the abraded surface of the vehicle so as to rinse the abraded surface of particulate matter;
    (e) providing the robotic assembly with an abrasive disc cleaning assembly comprising a cylindrical cleaning canister;
    (f) maneuvering the robotic hand so as to coaxially align the at least one attachment pad and the at least one abrasive disc attached thereto with the cleaning canister and thereafter inserting the at least one attachment pad and the at least one abrasive disc attached thereto into the cleaning canister; and
    (g) causing a cleaning fluid to be directed against the abrasive disc within the cleaning canister.

7. A process for preparing a vehicle surface for painting comprising the steps of:

(a) providing a preparation booth which is sized and configured to house a vehicle having the vehicle surface, wherein the preparation booth includes at least one robotic assembly which is reciprocally movable within the preparation booth relative to a longitudinal axis of the vehicle, the robotic assembly comprising a robotic hand having at least one abrasive disc attached to an attachment pad of the robotic hand, and at least one nozzle for discharging a stream of rinse fluid;

(b) positioning the vehicle having the vehicle surface to be prepared for painting within the preparation booth;

(c) operating the at least one robotic assembly to cause the at least one abrasive disc of the robot hand to abrade the surface of the vehicle;

(d) maneuvering the robotic hand so that the at least one nozzle is directed toward the abraded vehicle surface and discharging the stream of rinse fluid through the at least one nozzle and towards the abraded surface of the vehicle so as to rinse the abraded surface of particulate matter;

(e) maintaining a stack of unused abrasive discs within a cylindrical sleeve cage of a disc replenishment system;

(f) slideably moving a sleeve base member within the cylindrical sleeve cage to advance the stack of unused abrasive discs toward an open forward end of the cylindrical sleeve cage; and (g) moving a shutter element of the cylindrical sleeve cage between an inoperative position wherein the open forward end of the cylindrical sleeve cage is uncovered by the shutter element so as to expose a forwardmost one of the at least one abrasive discs in the stack, and an operative condition wherein the open forward end of the cylindrical sleeve cage is covered by the shutter element.

8. A process for preparing a vehicle surface for painting comprising the steps of:

(a) providing a preparation booth which is sized and configured to house a vehicle having the vehicle surface, wherein the preparation booth includes at least one robotic assembly which is reciprocally movable within the preparation booth relative to a longitudinal axis of the vehicle, the robotic assembly comprising a robotic hand having at least one abrasive disc attached to an attachment pad of the robotic hand, and at least one nozzle for discharging a stream of rinse fluid;

(b) positioning the vehicle having the vehicle surface to be prepared for painting within the preparation booth;

(c) operating the at least one robotic assembly to cause the at least one abrasive disc of the robot hand to abrade the surface of the vehicle;

(d) maneuvering the robotic hand so that the at least one nozzle is directed toward the abraded vehicle surface and discharging the stream of rinse fluid through the at least one nozzle and towards the abraded surface of the vehicle so as to rinse the abraded surface of particulate matter; and (e) removing an exhausted abrasive disc from the attachment pad by the steps of:

(e1) providing a target platform for receiving the attachment pad and the exhausted abrasive disc attached thereto;

(e2) reciprocally moving a finger element between raised and lowered positions so as to cause the finger element to engage a perimetrical edge of the exhausted abrasive disc when in said lowered position to thereby positionally capture the exhausted abrasive disc against the target platform, and (e3) causing the robotic hand to tilt away from the finger element while the exhausted abrasive disc is positionally captured against the target platform thereby responsively stripping the exhausted abrasive disc from the attachment pad of the robotic hand.

9. The process according to claim 8, wherein step (e) further comprises: (e4) discharging pressurized air through apertures of the target platform to thereby blow the exhausted abrasive disc away from the target platform when the finger element is in the raised position thereof.

10. The process according to claim 8, further comprising:

(f) maintaining a stack of unused abrasive discs within a cylindrical sleeve cage of a disc replenishment system;

(g) slideably moving a sleeve base member within the sleeve cage to advance the stack of unused abrasive discs toward an open forward end of the cylindrical sleeve cage; and (h) moving a shutter element of the cylindrical sleeve cage between an inoperative position wherein the open forward end of the cylindrical sleeve cage is uncovered by the shutter element so as to expose a forwardmost abrasive disc in the stack of unused abrasive discs, and an operative condition wherein the open forward end of the cylindrical sleeve cage is covered by the shutter element.

11. A process for preparing a vehicle surface for painting comprising the steps of:

(a) positioning a vehicle having the surface to be prepared for painting within a preparation booth;

(b) operating at least one robotic assembly to cause at least one abrasive disc removably attached to an attachment pad associated with a robot hand of the at least one robotic assembly to abrade the surface of the vehicle; and (c) removing the at least one abrasive disc upon abrasive exhaustion thereof by the steps of:

(c1) providing a target platform for receiving the attachment pad and the at least one abrasive disc attached thereto;

(c2) reciprocally moving a finger element between raised and lowered positions so as to cause the finger element to engage a perimetrical edge of the at least one abrasive pad when in the lowered position to thereby positionally capture the at least one abrasive disc against the target platform, and (c3) causing the robotic hand to tilt away from the finger element while the at least one abrasive disc is positionally captured against the target platform thereby responsively stripping the at least one abrasive disc from the attachment pad of the robotic hand.

12. The process according to claim 11, wherein step (c) further comprises: (c4) discharging pressurized air through apertures of the target platform to thereby blow the exhausted abrasive disc away from the target platform when the finger element is in the raised position thereof.

13. A process for preparing a vehicle surface for painting comprising the steps of:

(a) positioning a vehicle having the surface to be prepared for painting within a preparation booth;

(b) providing at least one robotic assembly with at least one abrasive disc removably attached to an attachment pad associated with a robot hand of the at least one robotic assembly by:

(b1) maintaining a stack of abrasive discs within a cylindrical sleeve cage of a disc replenishment system;

(b2) slideably moving a sleeve base member within the sleeve cage to advance the stack of abrasive discs toward an open forward end of the cylindrical sleeve cage; and (b3) moving a shutter element of the cylindrical sleeve cage between an inoperative position wherein the open forward end of the cylindrical sleeve cage is uncovered by the shutter element so as to expose a forwardmost one of the abrasive discs in the stack, and an operative condition wherein the open forward end of the cylindrical sleeve cage is covered by the shutter element; and (b4) maneuvering the robotic hand relative to the disc replenishment system to allow the forwardmost one of the abrasive discs in the stack to be attached onto the attachment pad of the robotic hand; and thereafter (c) operating the at least one robotic assembly to cause the at least one abrasive disc of the at least one robotic assembly to abrade the surface of the vehicle.

* * * * *